United States Patent [19]
Yoshida

[11] Patent Number: 5,289,399
[45] Date of Patent: Feb. 22, 1994

[54] MULTIPLIER FOR PROCESSING MULTI-VALUED DATA

[75] Inventor: Yukihiro Yoshida, Ikoma, Japan

[73] Assignee: Sharp Kabushiki Kaisha, Osaka, Japan

[21] Appl. No.: 984,695

[22] Filed: Dec. 2, 1992

[30] Foreign Application Priority Data

Dec. 6, 1991 [JP] Japan .................. 3-323205

[51] Int. Cl.$^5$ .................................. G06F 7/52
[52] U.S. Cl. ........................ 364/754; 364/759; 364/741.2
[58] Field of Search .................. 364/757–759, 364/754, 746.2

[56] References Cited

U.S. PATENT DOCUMENTS

| | | | |
|---|---|---|---|
| 3,617,723 | 11/1971 | Melvin | 364/759 |
| 3,805,043 | 4/1974 | Clary | 364/758 |
| 4,796,219 | 1/1989 | Williams | 364/758 |
| 5,021,987 | 6/1991 | Chan et al. | 364/754 |

FOREIGN PATENT DOCUMENTS

59-38849  3/1984  Japan .

Primary Examiner—Tan V. Mai

[57] ABSTRACT

A multiplier, which is capable of processing a multiplication of multi-valued data, includes a register transforming circuit (RC) for shifting data stored and outputting a plurality of data, a multiplying circuit connected to the register transforming circuit (RC) for multiplying the outputs from the register transforming circuit (RC) and an adding circuit connected to the multiplying circuit for adding the multiplied results according to a predetermined arithmetic rule based on logic to be used. The multiplier further includes an AND circuit element connected to the adding circuit for shifting and sending out the outputs from the adding circuit. A W register is connected to the adding circuit for storing the shifted outputs from the adding circuit according to the AND circuit element, and a further AND circuit element is connected to the W register for shifting and sending out the outputs from the W register. Another AND circuit element is connected to the further AND circuit element for further shifting the outputs from the further AND circuit element. Finally, a W register is connected to the further AND circuit element for storing the shifted output from the W register.

19 Claims, 22 Drawing Sheets

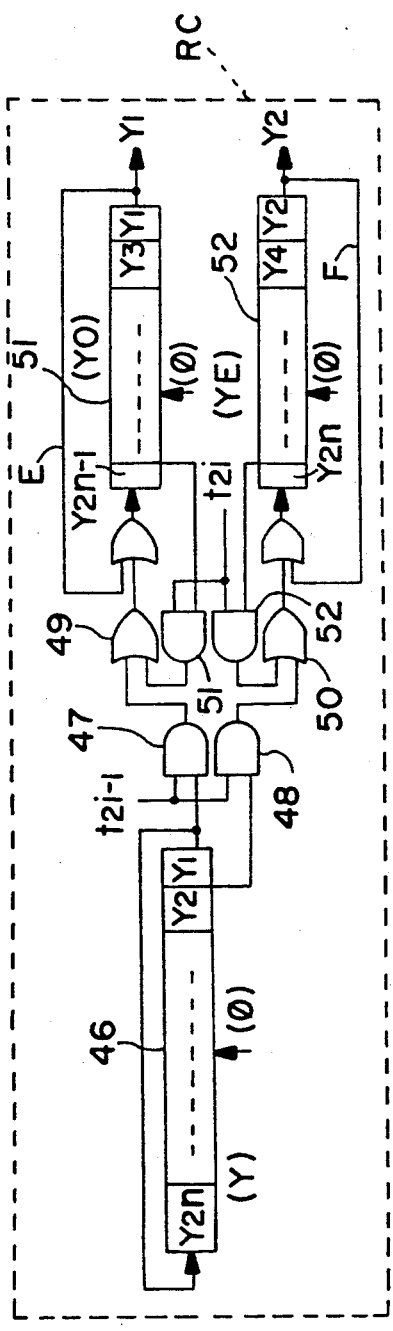
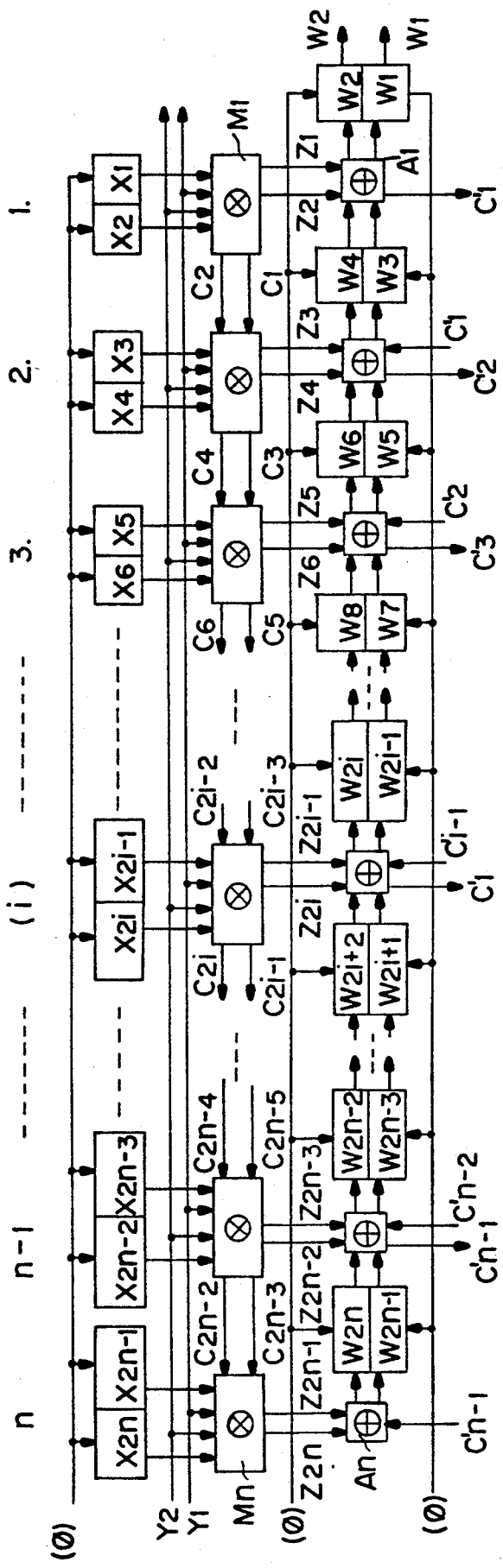
FIG. 3

MULTIPLIER FOR PROCESSING MULTI-VALUED DATA

BACKGROUND OF THE INVENTION

1. Field of the Invention

The present invention relates to a multiplier which may suitably apply to processing data such as image data, data from a communication signal or fonts used in a laser printer. More particularly it relates to a multiplier which may process multi-valued signals such as binary signals or quadruple signals.

2. Background of the Related Art

In general, it is known that a multiplier is one kind of arithmetic and logic unit used in an electronic computer and is dedicated to multiplication. Herein, the term "multiplication" means deriving a partial product of a multiplicand and each part (one or more bits) of a multiplier and adding the derived partial products to one another.

The multiplication is built as a standard function in the recent computer. To improve the operating performance, several kinds of methods have been developed. As one method for enhancing the operating performance (speed), the Booth algorithm can be used. The Booth algorithm is arranged to reduce the number of units for producing a partial product and make the arrangement of each unit simpler. As another method, the Wallace tree can be used. The Wallace tree uses a tree for making the additions of partial products as parallel as possible, thereby reducing the necessary adding time.

As another method for a very large scale integrated circuit (VLSI), a method has been used where the used fundamental circuits are arranged in a two-dimensional regular array format. A so-called array multiplier corresponds to a multiplier using this method.

However, all of the above-mentioned multiplying methods have a disadvantage in that they cannot theoretically yield a long enough time margin to rapidly and stably perform a multiplication.

Furthermore, those serial or parallel multiplication methods have a disadvantage in that they cannot be used for both of a binary signal and a quadruple signal and cannot perform a rapid multiplication.

SUMMARY OF THE INVENTION

It is therefore an object of the present invention to provide a multiplier which can apply to multi-valued signals such as a binary signal and a quadruple signal, and which can perform stably a high-speed multiplication.

The above-mentioned object can be achieved by an apparatus for processing a multiplication of multi-valued data, including a register-converting unit for shifting data stored therein and outputting the shifted data thereform, a multiplying unit connected to the register-converting unit for multiplying the shifted data output from the register-converting unit, an adding unit connected to the multiplying unit for adding the multiplied results according to a predetermined method, and a unit for shifting the added results output from the adding unit and for outputting the shifted results.

Preferably, the shifting unit includes a first shifting unit connected to the adding unit for shifting the added results output from the adding unit and for outputting the shifted results.

More preferably, the apparatus further comprises a unit for storing the shifted results output from the shifting unit.

Further preferably, the storing unit includes a first register connected to the adding unit for storing the shifted results output from the adding unit according to the first shifting unit.

The shifting unit further includes a second shifting unit connected to the first register for shifting the stored results and for outputting the shifted results therefrom, preferably.

The storing unit further includes a second register connected to the second shifting unit for storing the shifted results output from the first register, preferably.

The shifting unit further includes a third shifting unit connected to the second shifting unit for further shifting the shifted results output from the second shifting unit.

The stored data can preferably be a binary signal.

Also, the stored data can preferably be a triple signal.

Further, the stored data can preferably be a quadruple signal.

In operation, the register-converting unit serves to shift the stored data and output a plurality of pieces of data to the multiplying unit. The multiplying unit serves to perform multiplications of the output pieces of data and send the results to the adding unit. The adding unit serves to operate on the multiplied results based on a predetermined method and send the added result to the first shifting unit. The first shifting unit serves to shift the added result and send to the first register. The first register stores the shifted data therein. Then, the data is sent from the first register to the second shifting unit in which the data is shifted. The shifted data is sent from the second shifting unit to the third shifting unit in which the data is further shifted. Then, the last shifted result is stored in the second register.

This results in doubling the multiplying speed, thus enhancing the operating stability without having to lower the multiplying speed if the clock frequency is halved.

The object of the present invention also can be achieved by a multiplier which is capable of processing a multiplication of multi-valued data, includes a register transforming unit for shifting data stored and outputting a plurality of data, a multiplying unit connected to the register transforming unit for multiplying the outputs from said register transforming unit, an adding unit connected to the multiplying unit for adding the multiplied results according to a predetermined method, a first shifting unit connected to the adding unit for shifting and sending out the outputs from the adding unit, a first register connected to the adding unit for storing the shifted outputs from the adding unit according to the first shifting unit, a second shifting unit connected to the first register for shifting and sending out the outputs from the first register, a third shifting unit connected to the second shifting unit for further shifting the outputs from the second shifting unit, and a second register connected to the second shifting unit for storing the shifted output from the first register.

In operation, the register transforming unit serves to shift the stored data and output a plurality of pieces of data to the multiplying unit. The multiplying unit serves to perform multiplications of the output pieces of data and sends the results to the adding unit. The adding unit serves to operate on the multiplied results based on a particular method and send the added result to the first shifting unit. The first shifting unit serves to shift the added result and send to the first register. The first register stores the shifted data therein. Then, the data is sent from the first register to the second shifting unit in which the data is shifted. The shifted data is sent from the second shifting unit to the third shifting unit in which the data is further shifted. Then, the last shifted result is stored in the second register.

This results in doubling the multiplying speed, thus enhancing the operating stability without having to lower the multiplying speed if the clock frequency is halved.

The object of the present invention further can be achieved by a multiplier which is suitable to process multi-valued data, and which includes a register-convert unit for shifting data stored therein and for outputting the shifted data, a plurality of first data output units for outputting first data based on a predetermined method, a plurality of multiplication units connected to the register converting unit and the first data output units for multiplying an output from the register-convert unit and an output from the first data output units, a plurality of second data output units for outputting second data based on a predetermined method, and a plurality of addition units connected to the multiplication units for adding an output from the multiplication units, an output from the second data output units and a specific input altogether, and for outputting the added result to another second data output unit located adjacent to the second data output units.

Preferably, an addition unit located at an end of the plurality of addition units is capable of adding an output of the multiplication units and the specific input, and outputting the added result to the second data output unit located adjacent to the adding unit.

In operation, the register converting unit serves to shift the stored data and output the shifted data. In the meantime, the two or more first data output units serve to output the first data based on the predetermined method. The two or more multiplying units are connected to the register converting unit and the two or more first data output units and serve to multiply the shifted outputs of the register converting unit by the outputs of the two or more first output units. Then, the two or more second data output units serve to output the second data based on the predetermined method. The two or more adding units are connected to those multiplying units and serve to perform an addition of one output of the multiplying units, one output of the second data output units and a specific input and then to output the added result to the adjacent second data output unit. The adding unit located at the extreme end serves to add the output of the multiplying unit to a particular input and then to output the added result to the second data output unit located adjacently to the adding unit.

This operation makes it possible to double the multiplying speed and thus enhance the operating stability without having to lower the multiplying speed even if the clock frequency is halved.

Further objects and advantages of the present invention will be apparent from the following description of the preferred embodiments of the invention as illustrated in the accompanying drawings.

BRIEF DESCRIPTION OF THE DRAWINGS

FIG. 3 is a block diagram showing a 2-bit-unit full-bit parallel type multiplier according to a third embodiment of the invention;

DESCRIPTION OF THE PREFERRED EMBODIMENTS

Referring to the accompanying drawings, an embodiment of a multiplier according to the present invention will be described in detail.

Figure 1:
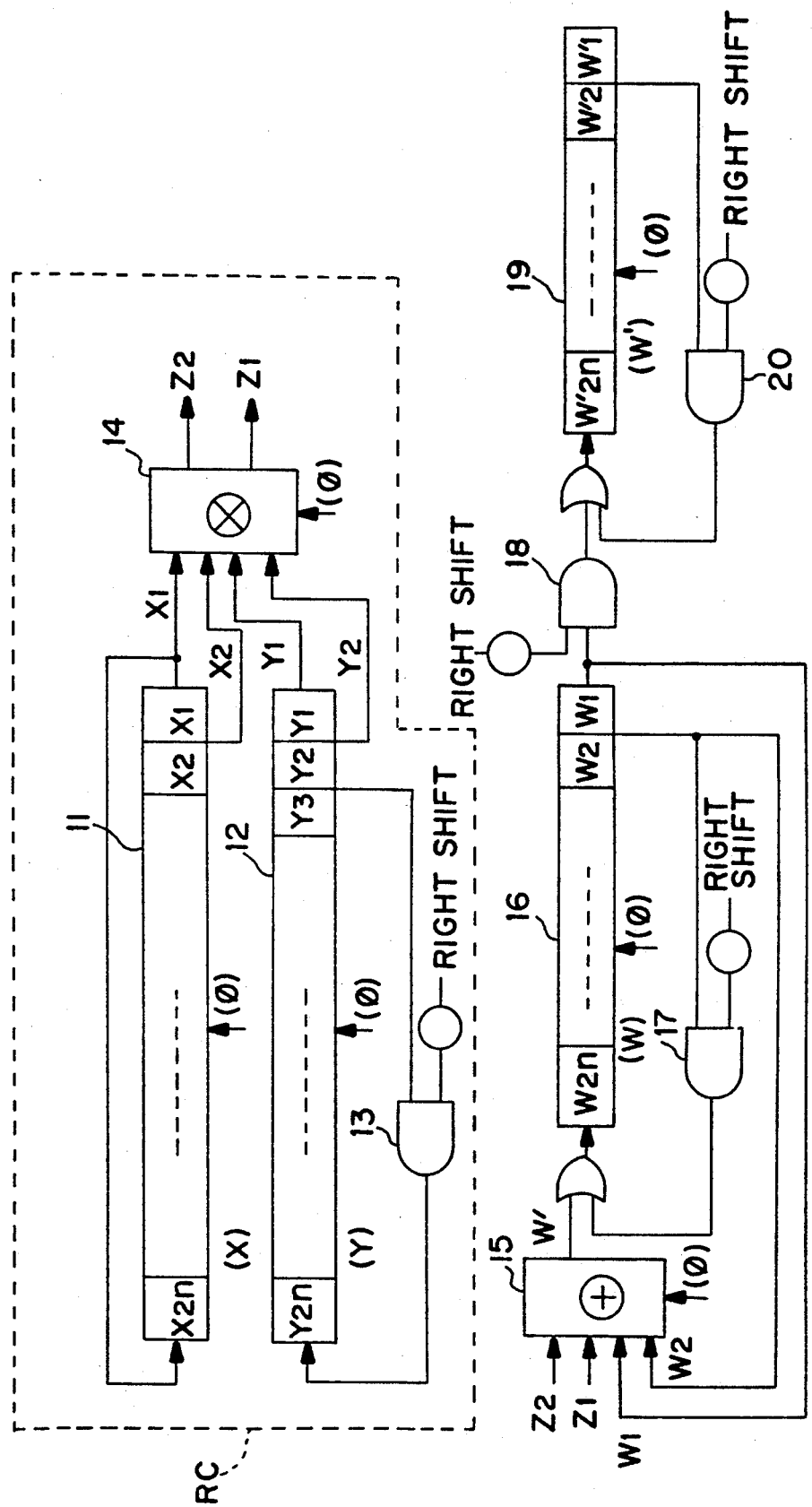
FIG. 1 is a block diagram showing a 2-bit parallel and serial type multiplier according to a first embodiment of the invention.

FIG. 1 is a block diagram showing a 2-bit parallel and serial-type multiplier (hereinafter, simply referred to as a multiplier) according to a first embodiment of the present invention.

As shown in FIG. 1, the multiplier is arranged to have a register circuit RC, a multiplying circuit 14, an adding circuit 15, a W register 16, an AND circuit element 17, an AND circuit element 18, a W' register 19, and an AND circuit element 20.

The register circuit RC includes an X register 11, a Y register 12, and an AND circuit element 13 connected to the Y register 12.

The multiplying circuit 14 is connected to the X register 11 and the Y register 12. The adding circuit 15 is connected to the multiplying circuit 14. The W register 16 is connected to the adding circuit 15. The AND circuit element 17 is connected to the W register 16. The W' register 19 is connected to the AND circuit element 18. The AND circuit element 20 is connected to the W' register 19.

Next, an operation of the multiplier shown in FIG. 1 will be described.

In the arrangement shown in FIG. 1, a multiplication and an addition are performed in a 2-bit parallel manner at each time $t_{2i-1}$ ($i=1, 2, 3, \ldots, n$). Thereby, a time margin $\phi$ is yielded at a time $t_{2i}$. This means that the multiplication and the addition are required to be performed only once at each $2\phi$.

To rapidly implement the serial multiplication, the stable multiplication is made possible without changing the multiplying time. Each bit in the Y register 12 is maintained while it is multiplied by the content of the X register 11. The multiplied result of the content of the X register 11 with the content of the Y register 12 by the multiplying circuit 14 is supplied to the W register through the adding circuit 15.

Each time the multiplication and the addition are terminated in a 2-bit parallel manner, the data stored in the Y register 12 is shifted to the right direction by two bits in response to a right-shift instruction input to the AND circuit element 13. At a time, the data stored in the W register 16 and the W' register 19 are shifted to the right direction by one bit in response to a right-shift instruction input to the AND circuit element 17 and a right-shift instruction input to the AND circuit element 20, respectively.

After the foregoing operation is repeated n times, the multiplied result of the contents of the X register 11 and the Y register 12 is stored in both the W register 16 and the W' register 19. This is the end of the series of multiplications.

Figure 2:
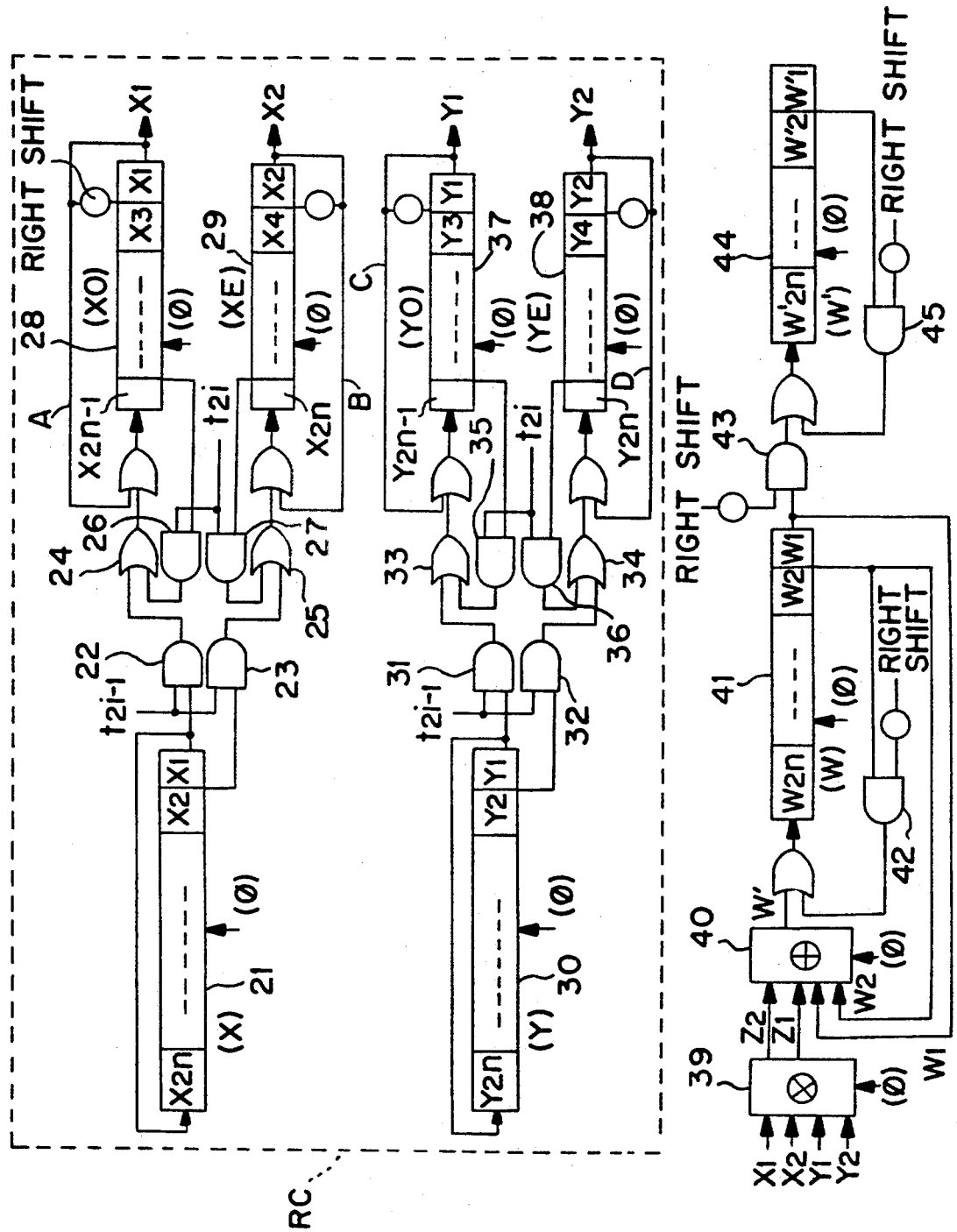
FIG. 2 is a full 2-bit parallel and serial type multiplier according to a second embodiment of the invention.

FIG. 2 is a block diagram showing a full 2-bit parallel and serial type multiplier (hereinafter, simply referred to as a multiplier) according to a second embodiment of the present invention.

The multiplier shown in FIG. 2 is basically equivalent to the multiplier shown in FIG. 1, except the arrangement of the register circuit.

As shown in FIG. 2, the multiplier is arranged to have an X register 21, AND circuit elements 22, 23, an OR circuit element 24, an OR circuit element 25, an AND circuit element 26, an AND circuit element 27, an XO register 28, an XE register 29, a Y register 30, AND circuit elements 31, 32, an OR circuit element 33, an OR circuit element 34, an AND circuit element 35, an AND circuit element 36, an YO register 37, an YE register 38, a multiplying circuit 39, an adding circuit 40, a W register 41, AND circuit elements 42, 43, a W' register 44, and an AND circuit element 45.

The AND circuit elements 22, 23 are connected to the X register 21. The OR circuit element 24 is connected to the AND circuit element 22. The OR circuit element 25 is connected to the AND circuit element 23. The AND circuit element 26 is connected to the OR circuit element 24. The AND circuit element 27 is connected to the OR circuit element 25. The XO register 28 is connected to the OR circuit element 24. The XE register 29 is connected to the OR circuit element 25. The AND circuit elements 31, 32 are both connected to the Y register 30. The OR circuit element 33 is connected to the AND circuit element 31. The OR circuit element 34 is connected to the AND circuit element 32. The AND circuit element 35 is connected to the OR circuit element 33. The AND circuit element 36 is connected to the OR circuit element 34. The YO register 37 is connected to the OR circuit element 33. The YE register 38 is connected to the OR circuit element 34. The multiplying circuit 39 is connected to the XO register 28, the XE register 29, the YO register 37, and the YE register. The adding circuit 40 is connected to the multiplying circuit 39. The W register 41 is connected to the adding circuit 40. The AND circuit elements 42, 43 are connected to the W register 41. The W' register 44 is connected to the AND circuit element 43. The AND circuit element 45 is connected to the W' register 44.

Next, an operation of the multiplier shown in FIG. 2 will be described.

The X register 21 consisting of 2n bits is separated into the XO register 28 and the XE register 29. The XO register 28 consists of n odd bits and the XE register 29 consists of n even bits, respectively.

Likewise, the Y register 30 separated into the YO register 37 and the YE register 38. The YO register 37 consists of n odd bits and the YE register 38 consists of n even bits, respectively.

Then, the serial outputs $X_1$ and $X_2$ of the XO register 28 and the XE register 29 and the serial outputs $Y_1$ and $Y_2$ of the YO register 37 and the YE register 38 are input to the multiplying circuit 39.

Each bit of the YO register 37 and the YE register 38 is maintained while it is multiplied by the contents of the XO register 28 and the XE register 29, respectively. The multiplied results are all input to the W register 41. On each termination of the multiplication and the addition in the full 2-bit parallel manner, the data stored in the YO register 37 and the YE register 38 are shifted to the right-direction by one bit in response to the right-shift instruction. At a time, the W register 41 and the W' register 44 are shifted to the right-direction by one bit in response to the right-shift instructions input to the AND circuit elements 42 and 45, respectively.

After the foregoing operation is repeated n times, the multiplied result of the contents of the X register 21 and the Y register 30 is stored in both the W register 41 and the W' register 44. This is the end of the series of multiplications.

Though the multiplier shown in FIG. 2 is the same serial type one as the multiplier shown in FIG. 1, one word of the multiplier shown in FIG. 1 has a 2n-bit length, while one word of the multiplier shown in FIG. 2 has an n-bit length. The latter multiplier needs only half as long a time as the former multiplier in performing the multiplication.

FIG. 3 is a block diagram showing a 2-bit-unit full-bit parallel type multiplier (hereinafter, simply referred to as a multiplier) according to a third embodiment of the present invention.

As shown in FIG. 3, the multiplier is arranged to have a register circuit RC, an $X_1$-bit circuit $X_1$ to an $X_{2n}$-bit circuit $X_{2n}$, multiplying circuits $M_1$ to $M_n$, a $W_1$-bit circuit $W_1$ to a $W_{2n}$-bit circuit $W_{2n}$, and adding circuits $A_1$ to $A_n$.

In the register circuit RC, the AND circuit element 47, 48 are connected to the Y register 46. The OR circuit element 49 connected to the AND circuit element 47. The OR circuit element 50 connected to the AND circuit element 48. The AND circuit element 51 is connected to the OR circuit 49. The AND circuit element 52 is connected to the OR circuit element 50. The YO register 51 is connected to the OR circuit element 49.

Likewise, the YE register 52 is connected to the OR circuit element 50. The $X_1$-bit circuit $X_1$ to $X_{2n}$-bit circuit $X_{2n}$ operate to output the first data $X_1$ to $X_{2n}$ based on the predetermined method.

The multiplying circuits $M_1$ to $M_n$ are connected to the register circuit RC and the $X_1$-bit circuit $X_1$ to the $X_{2n}$-bit circuit $X_{2n}$ so that those multiplying circuits $M_1$ to $M_n$ perform a multiplication of the output of the register circuit RC and each output of the $X_1$-bit circuit $X_1$ to the $X_{2n}$-bit circuit $X_{2n}$. The $W_1$-bit circuit $W_1$ to $W_{2n}$-bit circuit $W_{2n}$ operate to output the second data $W_1$ to $W_{2n}$ based on the predetermined method.

The adding circuits $A_1$ to $A_n$ are connected to the multiplying circuits $M_1$ to $M_n$ so that each adding circuit performs an addition of each output of the multiplying circuits $M_1$ to $M_n$, each output of the $W_3$-bit circuit $W_3$ to the $W_{2n}$-bit circuit $W_{2n}$ and each particular input $C'_1$ to $C'_{n-1}$ and then outputs the added result to the $W_1$-bit circuit $W_1$ to the $W_{2n}$-bit circuit $W_{2n}$ located adjacently to the adding circuits $A_1$ to $A_n$, respectively.

Next, each of the above-mention structure elements of the multiplier shown in FIG. 3 will be described.

As shown, the register circuit RC includes the Y register 46, the AND circuit elements 47, 48 connected to the Y register 46, the OR circuit element 49 connected to the AND circuit element 47, the OR circuit element 50 connected to the AND circuit element 48, the AND circuit element 51 connected to the OR circuit element 49, the AND circuit element 52 connected to the OR circuit element 50, the YO register 51 connected to the OR circuit element 49, and the YE register 52 connected to the OR circuit element 50.

At a first multiplying stage, the multiplying circuit $M_1$ is connected to the $X_1$-bit circuit $X_1$, the $X_2$-bit circuit $X_2$, the YO register 51 and the YE register 52.

At a second multiplying stage, the multiplying circuit $M_2$ is connected to the $X_3$-bit circuit $X_3$, the $X_4$-bit circuit $X_4$, the YO register 51, the YE register 52 and the multiplying circuit $M_1$.

At a third multiplying stage, the multiplying circuit $M_3$ is connected to the $X_5$-bit circuit $X_5$, the $X_6$-bit circuit $X_6$, the YO register 51, the YE register 52, and the multiplying circuit $M_2$.

At an i-th multiplying stage, the multiplying circuit $M_i$ is connected to the $X_{2i-1}$-bit circuit $X_{2i-1}$, the $X_{2i}$-bit circuit $X_{2i}$, the YO register 51, the YE register 52 and the multiplying circuit $M_{i-1}$.

At an (n−1)th multiplying stage, the multiplying circuit $M_{n-1}$ is connected to the $X_{2n-3}$-bit circuit $X_{2n-3}$, the $X_{2n-2}$-bit circuit $X_{2n-2}$, the YO register 51, the YE register 52, and the multiplying circuit $M_{n-2}$.

At an n-th multiplying stage, the multiplying circuit $M_n$ is connected to the $X_{2n-1}$-bit circuit $X_{2n-1}$, the $X_{2n}$-bit circuit $X_{2n}$, the YO register 51, the YE register 52, and the multiplying circuit $M_{n-1}$.

Turning to the adding stages, at a first adding stage, the adding circuit $A_1$ is connected to the $W_1$-bit circuit $W_1$, the $W_2$-bit circuit $W_2$, the $W_3$-bit circuit $W_3$, the $W_4$-bit circuit $W_4$ and the multiplying circuit $M_1$.

At a second adding stage, the adding circuit $A_2$ is connected to the $W_3$-bit circuit $W_3$, the $W_4$-bit circuit $W_4$, the $W_5$-bit circuit $W_5$, the $W_6$-bit circuit $W_6$ and the multiplying circuit $M_2$.

At a third adding stage, the adding circuit $A_3$ is connected to the $W_5$-bit circuit $W_5$, the $W_6$-bit circuit $W_6$, the $W_7$-bit circuit $W_7$, the $W_8$-bit circuit $W_8$, and the multiplying circuit $M_3$.

At an i-th adding stage, the adding circuit $A_i$ is connected to the $W_{2i}$-bit circuit $W_{2i}$, the $W_{2i-1}$-bit circuit $W_{2i-1}$, the $W_{2i+2}$-bit circuit $W_{2i+2}$, the $W_{2i+1}$-bit circuit $W_{2i+1}$ and the multiplying circuit $M_i$.

At an (n−1)th adding stage, the adding circuit $A_{n-1}$ is connected to the $W_{2n-2}$-bit circuit $W_{2n-2}$, the $W_{2n-3}$-bit circuit $W_{2n-3}$, the $W_{2n}$-bit circuit $W_{2n}$, the $W_{2n-1}$-bit circuit $W_{2n-1}$ and the multiplying circuit $M_{n-1}$.

At an n-th adding stage, the adding circuit $A_n$ is connected to the $W_{2n}$-bit circuit $W_{2n}$, the $W_{2n-1}$-bit circuit $W_{2n-1}$ and the multiplying circuit $M_n$.

Figure 4:
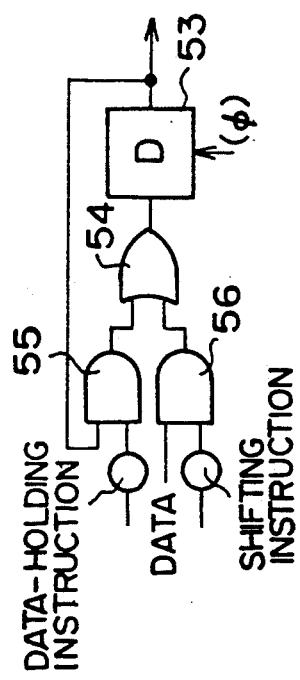
FIG. 4 is a block diagram showing a bit circuit composing the multiplier shown in FIG. 3.

As shown in FIG. 4, each bit circuit is arranged to have a D type flip-flop 53, and OR circuit element 54, an AND circuit element 55, and an AND circuit element 56.

The flip-flop 53 is a one-bit delay circuit. The OR circuit element 54 is connected to the flip-flop 53. The AND circuit element 55 is connected to the OR circuit element 54 and operates to accept a data-holding instruction. The AND circuit element 56 is connected to the OR circuit element 54 and operates to accept a shift instruction.

Next, an operation of the multiplier shown in FIG. 3 will be described.

This multiplier commonly corresponds to a quadruple logic or a binary logic. However, though it disables to use both of the logic at one time, it is also able to use either one. The combination of the binary logic and the quadruple logic is made possible.

If the quadruple logic is used, the I/O signals in the multiplier shown in FIG. 3 are made to be half as many as those used if the binary logic is used. The arrangement shown in FIG. 3 employs the binary logic.

Figure 5:
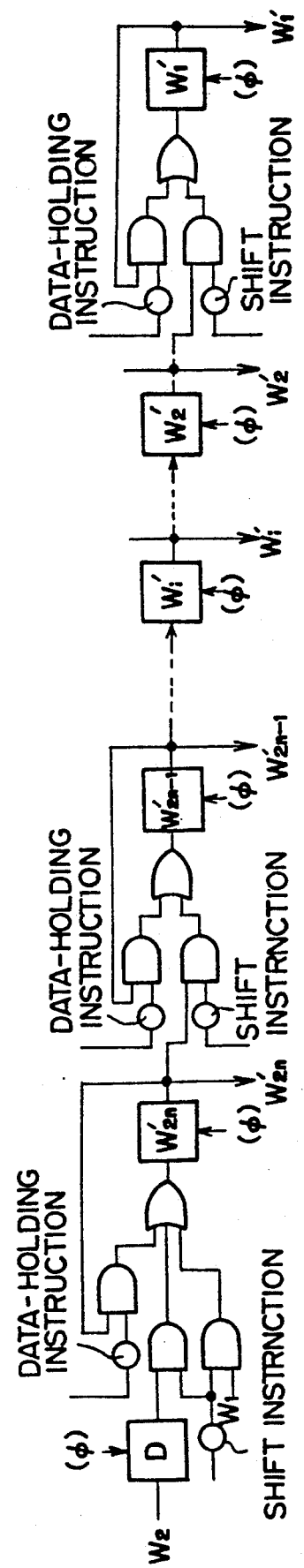
FIG. 5 is a block diagram showing a lower 2 n-bit circuit composing the multiplier shown in FIG. 3.

This multiplier may provides a final multiplying result of an n-bit multiplicand and an n-bit multiplier at the 2n-bit stage. To perform the multiplication of a number of a n+1 or more bit, more bits than 2n bits are required. Hence, as shown in FIG. 5, it is necessary to provide a register which enables storage of data shifted to the right-direction and supplies parallel outputs.

When performing a multiplication of n-bits×n-bits, the known full-bit binary parallel multiplier needs an operating time for processing 2n bits, because the length of one word is n bits and the multiplied result is 2n bits. On the other hand, the multiplier shown in FIG. 3 needs an operating time of only n bits even if the multiplication of two n-bit words is performed. That is, the multiplying speed is half as long as that of the known multiplier. It means that the operating speed is kept constant if the physical clock frequency is reduced to a half.

As such, the parallel operation done in the multiplier shown in FIG. 3 allows for a lot of I/O signals. Further, if the parallel operation employs the quadruple logic, the substantial number of signals can be reduced to a half. This means that the multiplier shown in FIG. 3 may effectively apply to the large scale integrated circuit (LSI).

Consider an expansion of the method used in the multiplier shown in FIG. 3. In performing a parallel multiplication on a 4-bit unit=$2^4$ (16 values), when multiplying two n-bit words, the expanded multiplication needs a multiplying time of (n/4) bit-time and an adding time of (n/4) bit-time. Hence, the overall time is an (n/2) bit-time. That is, the overall multiplying speed of the expanded method is made four times as fast as that of known multiplier.

In performing the parallel multiplication on the 3-bit unit=$2^3$ (8 values), the expanded multiplication needs a multiplying time of (n/3) bits and an adding time of (n/3) bits, though a redundant bit may take place. Hence, the overall time is an (2 n/3) bit-time. That is, the overall multiplying time of the expanded method is made three times as fast as that of known multiplier.

Figure 6:
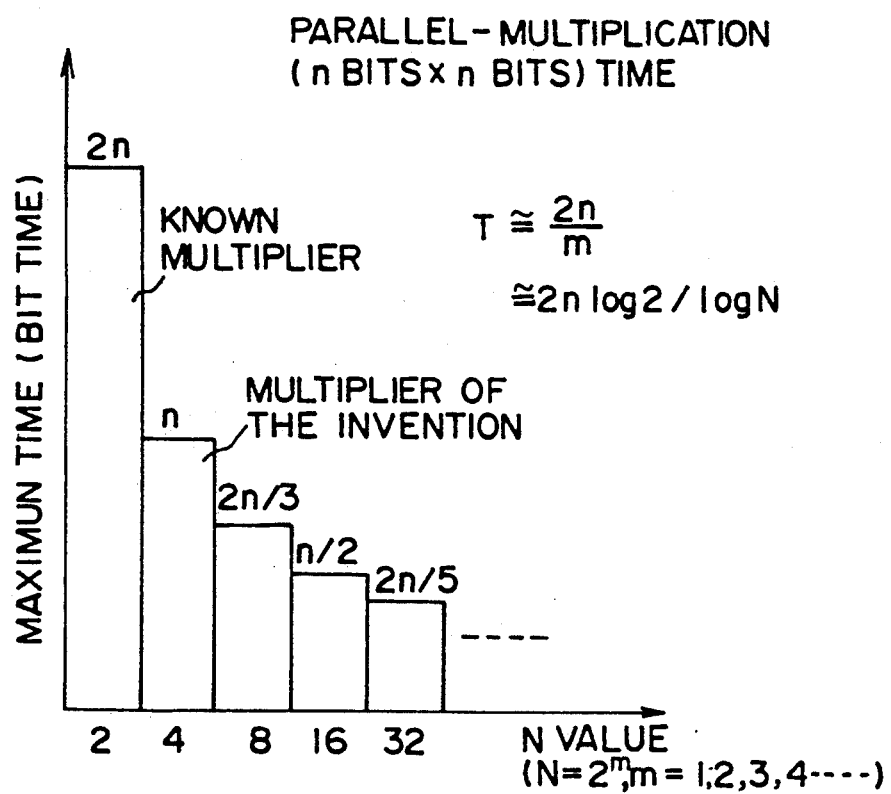
FIG. 6 is a graph showing a comparison of a multiplying time between the multiplier of this invention and the known multiplier.

As shown in FIG. 6, as the logic values are futher increased the overall multiplying time is made shorter, resulting in speeding up of the multiplier.

The foregoing multiplier according to this embodiment may commonly apply to the binary logic or the quadruple logic. The use of the quadruple logic needs only half as many signals as the use of the binary logic.

The following table 1 indicates the serial outputs and the particular constant given when the quadruple logic is used.

TABLE 1

| X2 | X1 | Y2 | Y1 | C2 | C1 | X | Y | C |
|---|---|---|---|---|---|---|---|---|
| 0 | 0 | 0 | 0 | 0 | 0 | 0 | 0 | 0 |
| 0 | 1 | 0 | 1 | 0 | 1 | $\frac{1}{3}$ | $\frac{1}{3}$ | $\frac{1}{3}$ |
| 1 | 0 | 1 | 0 | 1 | 0 | $\frac{2}{3}$ | $\frac{2}{3}$ | $\frac{2}{3}$ |
| 1 | 1 | 1 | 1 | x | x | 1 | 1 | x |

The logic expression standing for the above table 1 is as follows.

Expression (1)

$$X = \frac{1}{3} X_2 X_1 + \frac{2}{3} X_2 X_1 + X_2 X_1$$

$$Y = \frac{1}{3} Y_2 Y_1 + \frac{2}{3} Y_2 Y_1 + Y_2 Y_1$$

$$C = \frac{1}{3} C_2 C_1 + \frac{2}{3} C_2 C_1$$

Figure 7:
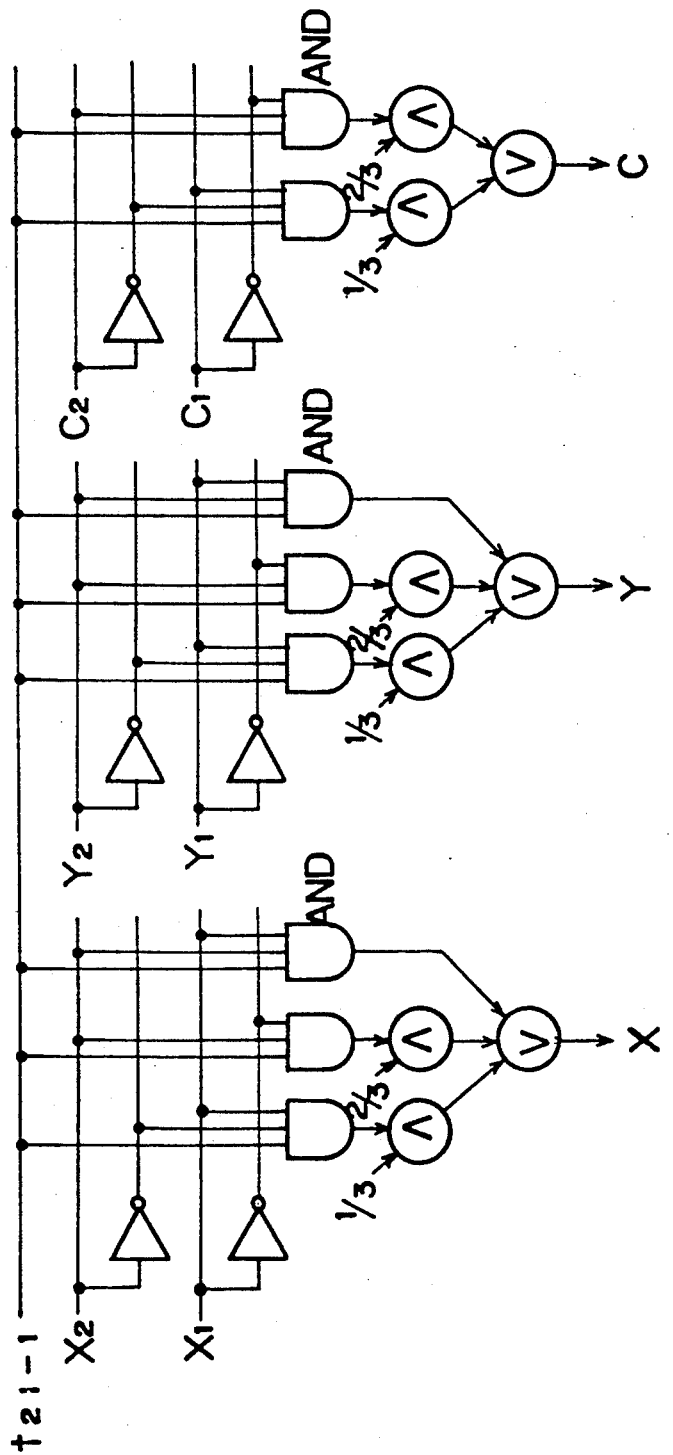
FIG. 7 is a block diagram showing a logic converting circuit applied to the multiplier shown in FIG. 1.

The expression (1) can be represented as a logic circuit shown in FIG. 7.

In FIG. 7, $\Lambda$ denotes an AND circuit and V denotes an OR circuit.

In the logic circuit of the multiplier, $X_0$, $X_{\frac{1}{3}}$, $X_{\frac{2}{3}}$, $X_1$, $Y_0$, $Y_{\frac{1}{3}}$, $Y_{\frac{2}{3}}$, $Y_1$, $C_0$, $C_{\frac{1}{3}}$, and $C_{\frac{2}{3}}$ denote equivalent circuits. That is, when an X input is 0, $\frac{1}{3}$, $\frac{2}{3}$ or 1, the output becomes 1. This holds true to Y. For C, when an input is 0, $\frac{1}{3}$ or $\frac{2}{3}$, the output becomes 1.

Figure 8:
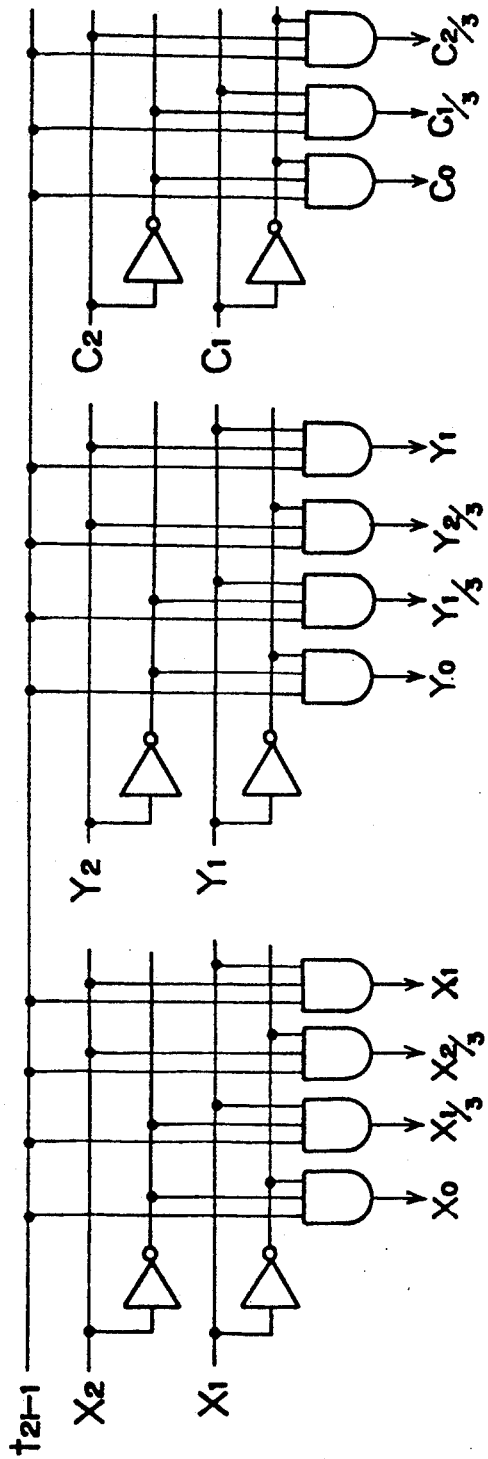
FIG. 8 is a block diagram showing a binary input circuit applied to the multiplier shown in FIG. 1.

If the binary logic is used, in FIG. 8, $X_0$, $X_{\frac{1}{3}}$, $X_{\frac{2}{3}}$, $X_1$, $Y_0$, $Y_{\frac{1}{3}}$, $Y_{\frac{2}{3}}$, $Y_1$, $C_0$, $C_{\frac{1}{3}}$, and $C_{\frac{2}{3}}$ denote the logically same but physically different circuit from those used in the logic circuit of the multiplier.

In succession, the logic of the multiplier will be described.

The equivalent logic (X≡0), (X≡$\frac{1}{3}$), (X≡$\frac{2}{3}$) and (X≡1) are represented by $X_0$, $X_{\frac{1}{3}}$, $X_{\frac{2}{3}}$ and $X_1$. Likewise, the equivalent logic (Y≡0), (Y≡$\frac{1}{3}$), (Y≡$\frac{2}{3}$) and (Y≡1) are represented by $Y_0$, $Y_{\frac{1}{3}}$, $Y_{\frac{2}{3}}$ and $Y_1$. The equivalent logic (C≡0), (C≡$\frac{1}{3}$) and (C≡$\frac{2}{3}$) are represented by $C_0$, $C_{\frac{1}{3}}$ and $C_{\frac{2}{3}}$.

The outputs $Z_2$ and $Z_1$ of the multiplier and the carrier outputs $C_2$ and $C_1$ are indicated in the charts 1 and 2.

chart 1

|  | $C_0$ | | | | $C_{\frac{1}{3}}$ | | | | $C_{\frac{2}{3}}$ | | | |
|---|---|---|---|---|---|---|---|---|---|---|---|---|
|  | $X_0$ | $X_{\frac{1}{3}}$ | $X_{\frac{2}{3}}$ | $X_1$ | $X_0$ | $X_{\frac{1}{3}}$ | $X_{\frac{2}{3}}$ | $X_1$ | $X_0$ | $X_{\frac{1}{3}}$ | $X_{\frac{2}{3}}$ | $X_1$ |
| $Y_0$ |  |  |  |  | 1 | 1 | 1 | 1 | 2 | 2 | 2 | 2 |
| $Y_{\frac{1}{3}}$ |  | 1 | 2 | 3 | 1 | 2 | 3 |  | 2 | 3 |  | 1 |
| $Y_{\frac{2}{3}}$ |  | 2 |  | 2 | 1 | 3 | 1 | 3 | 2 |  | 2 |  |
| $Y_1$ |  | 3 | 2 | 1 | 1 |  | 3 | 2 | 2 | 1 |  | 3 |

The chart 1 also represents the logic expression of the output $<Z>$ of the multiplier. To correspond to 0. 1, 2 and 3 of $<Z>$, ($Z_2$, $Z_1$) indicates (0, 0), (0, 1) (1, 0) or (1, 1). The blanks in the chart indicate 0 chart 2

|  | $C_0$ | | | | $C_{\frac{1}{3}}$ | | | | $C_{\frac{2}{3}}$ | | | |
|---|---|---|---|---|---|---|---|---|---|---|---|---|
|  | $X_0$ | $X_{\frac{1}{3}}$ | $X_{\frac{2}{3}}$ | $X_1$ | $X_0$ | $X_{\frac{1}{3}}$ | $X_{\frac{2}{3}}$ | $X_1$ | $X_0$ | $X_{\frac{1}{3}}$ | $X_{\frac{2}{3}}$ | $X_1$ |
| $Y_0$ |  |  |  |  |  |  |  |  |  |  |  |  |
| $Y_{\frac{1}{3}}$ |  |  |  |  |  |  |  | 1 |  |  | 1 | 1 |
| $Y_{\frac{2}{3}}$ |  | 1 |  | 1 |  | 1 | 1 | 1 |  | 1 | 1 | 2 |
| $Y_1$ |  | 1 |  | 2 |  | 1 | 1 | 2 |  | 1 | 2 | 2 |

The chart 2 also represents the logic expression of the carry output $<C>$. To correspond to 0, 1, and 2 of $<C>$, ($C_2$, $C_1$) indicates (0, 0), (0, 1) and (1, 0). The blanks in the chart indicate 0.

As described above, the multipliers according to the foregoing embodiments need adding circuits for performing multiplication. The multiplier according to the first embodiment uses the adder shown in FIG. 9.

Figure 10:
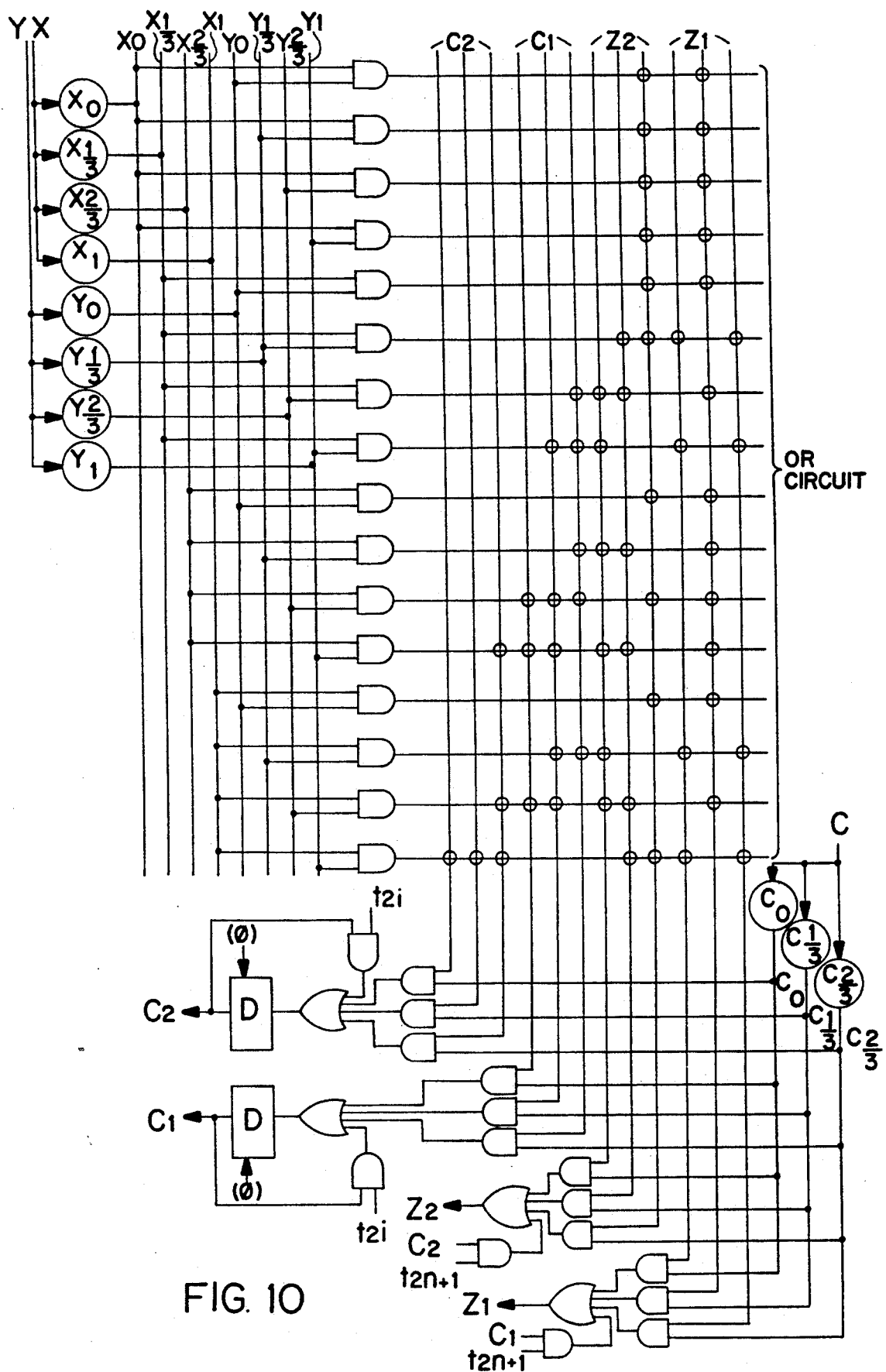
FIG. 10 is a block diagram showing a multiplying circuit applied to the multiplier shown in FIG. 1.

If the multiplier is configured of the output $<Z>$ and the carry output $<C>$, the resulting multiplier is the circuit shown in FIG. 10.

The multiplier shown in FIG. 10 performs a multiplication in a 2-bit parallel manner at each time $t_{2i-1}$ (i=1, 2, 3, ..., n). The multiplying output $<Z>$ indicated in the charts 1 and 2, that is, the logic expression of ($Z_2$, $Z_1$) is logically multiplied by a time $t_{2i-1}$.

Likewise, the carry output $<C>$, that is, ($C_2$, $C_1$) is logically multiplied by a time $t_{2i-1}$. This operation is used for the logic converting circuit shown in FIG. 7 or the binary input circuit shown in FIG. 8. The carry output $<C>$ takes place at the time $t_{2i}$ and is added to the multiplied output at the next $t_{2i-1}$. $C_2 t_{2i}$ and $C_1 t_{2i}$ are ORed into the OR circuit element.

Figure 9:
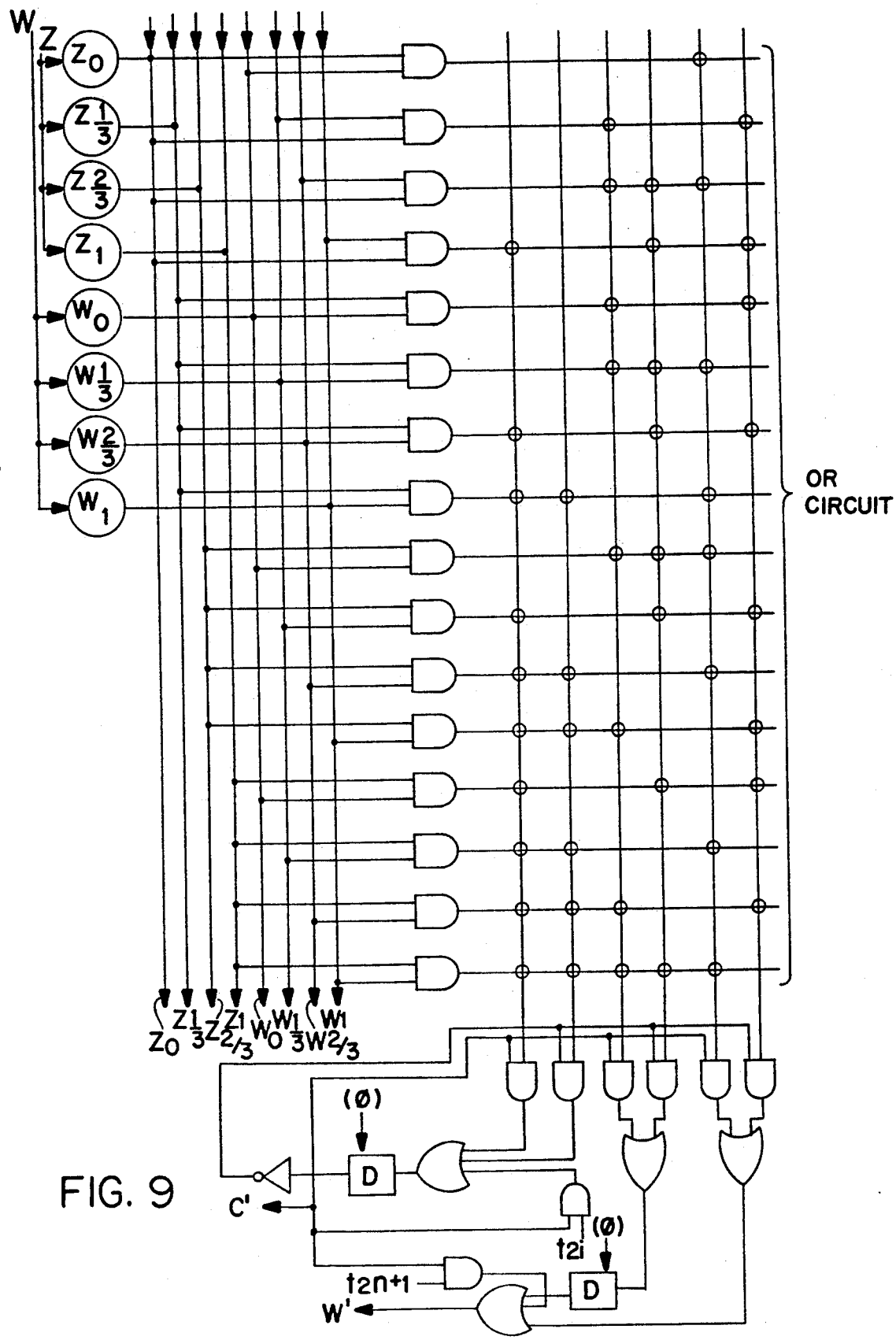
FIG. 9 is a block diagram showing an adding circuit applied to the multiplier shown in FIG. 1.
Figure 11:
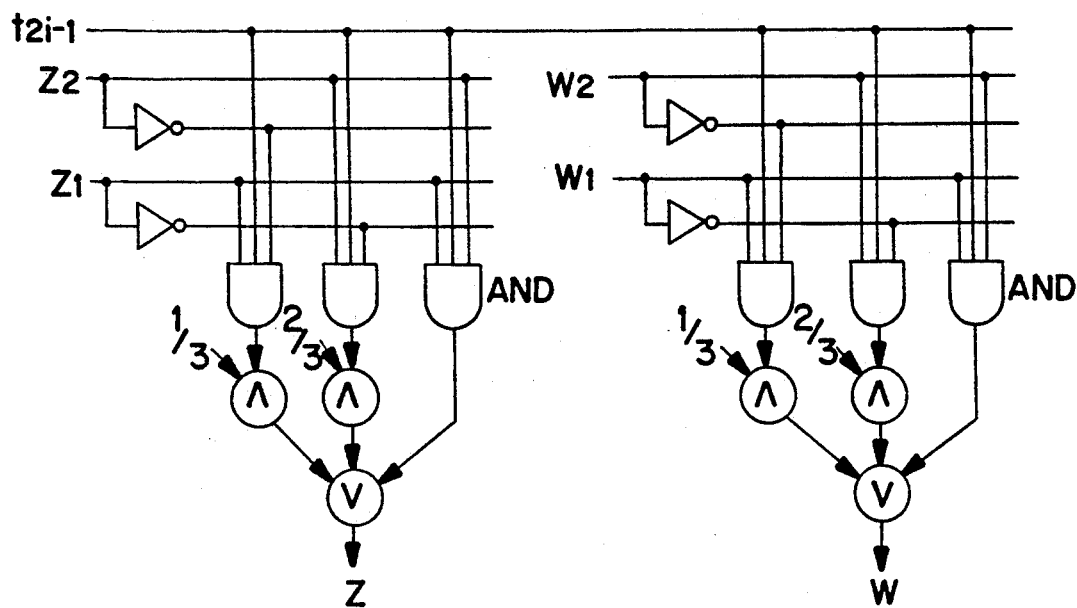
FIG. 11 is a block diagram showing a logic converting circuit applied to the multiplier shown in FIG. 1.
Figure 12:
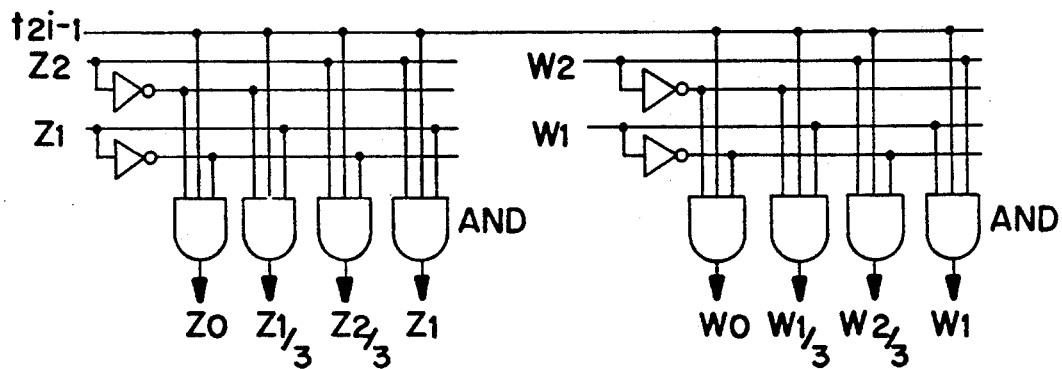
FIG. 12 is a block diagram showing a binary input circuit applied to the multiplier shown in FIG. 1.

($Z_2$, $Z_1$) of the multiplying output $<Z>$ is input to the logic converting circuit shown in FIG. 11 or the binary input circuit shown in FIG. 12 and is used in the adding circuit shown in FIG. 9.

The multiplier employs either one of the logic circuit shown in FIG. 7 or the binary input circuit shown in FIG. 8, but neither of them at one time. This holds true to the logic converting circuit shown in FIG. 11 or the binary input circuit shown in FIG. 12.

The multiplier according to this invention can commonly apply to the quadruple logic and the binary logic. In actuality, it employs either one. However, the combination of both logic can be used. In addition, considering that the carry output ($C_2$, $C_1$) may take place at the 2n-th bit (final bit), $C_2 t_{2n+1}$ and $C_1 t_{2n+1}$ are ORed with the output ($Z_2$, $Z_1$).

As described above, in the case of selecting the quadruple logic, the logic converting circuit shown in FIG. 11 is used. In the case of selecting the binary logic, the binary input circuit shown in FIG. 12 is used. To derive the multiplied result WZ of the output W and the output Z sent from the binary input circuit shown in FIG. 12, the adder shown in FIG. 9 is used.

The second parallel and serial type multiplier according to the first embodiment of the invention is configured of the adding circuit shown in FIG. 9 and the multiplying circuit shown in FIG. 10.

Figure 13:
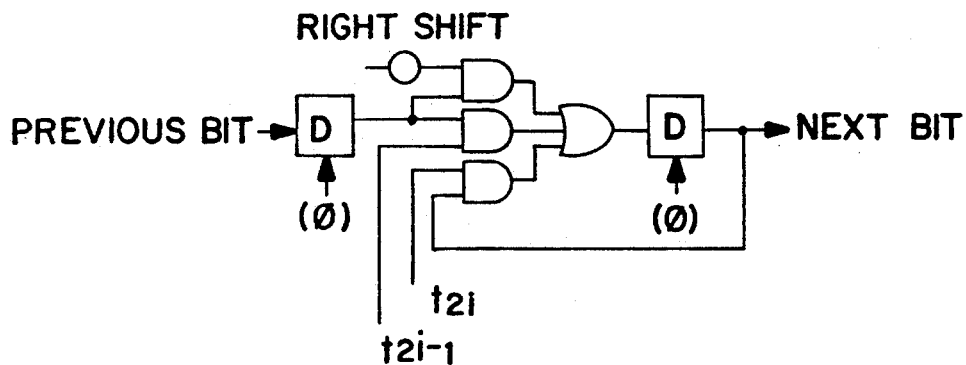
FIG. 13 is a block diagram showing a bit-shifting arrangement of each register shown in FIG. 2.

In the foregoing full 2-bit parallel and serial multiplier, each of the XO register 28, the XE register 29, the YO register 37, and the YE register 38 has the bit-shifting arrangement as shown in FIG. 13. Herein, XO denotes $X_{odd}$, XE denotes $X_{Even}$, YO denotes $Y_{odd}$ and YE denotes $Y_{Even}$.

Figure 14:
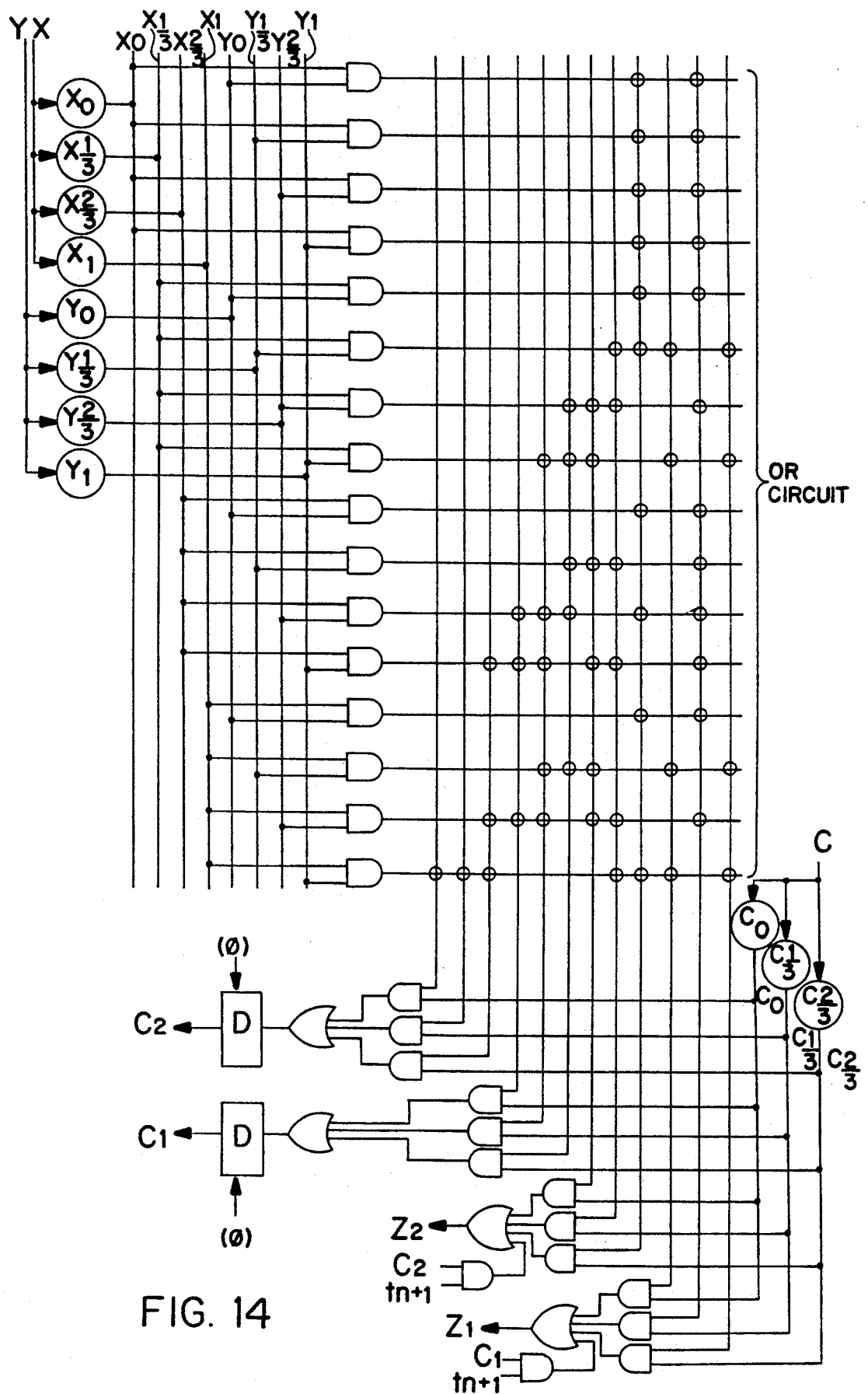
FIG. 14 is a block diagram showing a multiplying circuit applied to the multiplier shown in FIG. 2.
Figure 15C:
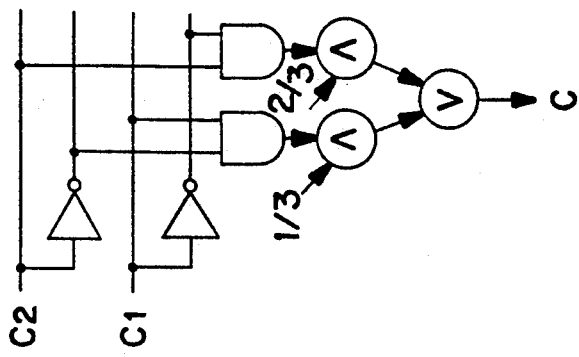
FIG. 15 is a block diagram showing an input to the multiplying circuit shown in FIG. 14.
Figure 15B:
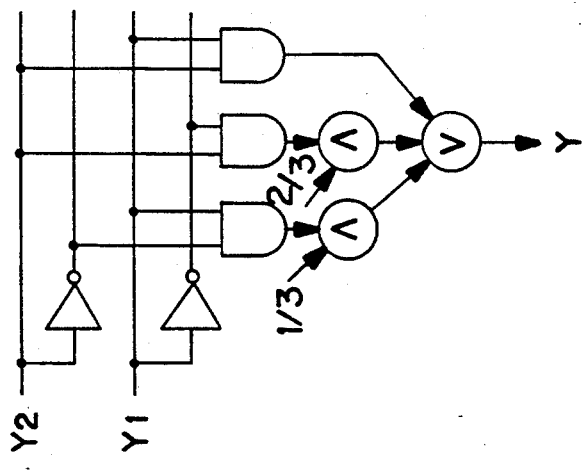
Figure 15A:
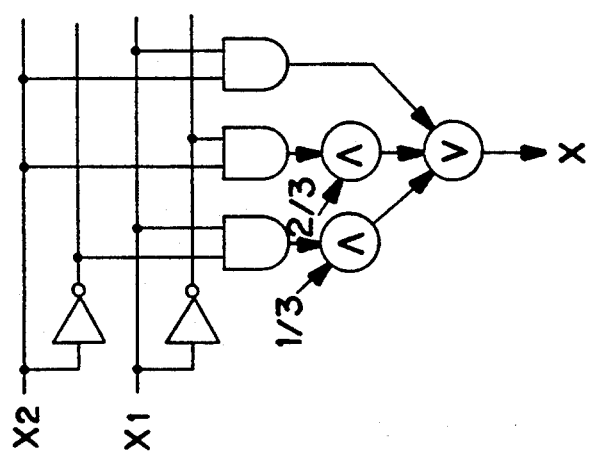
Figure 17A:
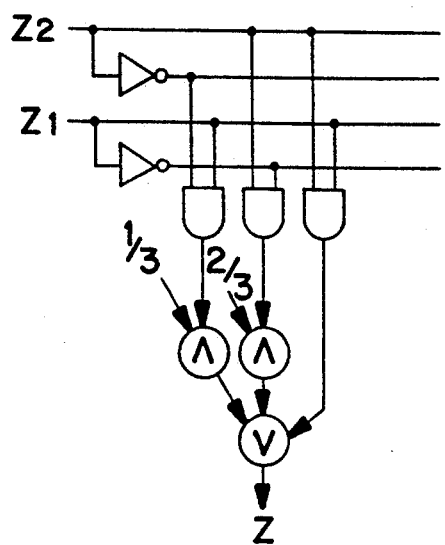
FIG. 17 is a block diagram for illustrating an input to the adding circuit shown in FIG. 16.
Figure 17B:
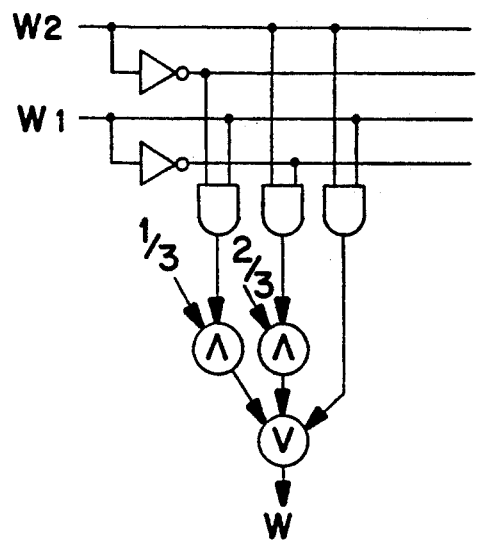

In the case of selecting the quadruple logic, the input to the multiplying circuit shown in FIG. 14 is as shown in FIG. 15. The input to the adding circuit is as shown in FIG. 17.

Figure 18A:
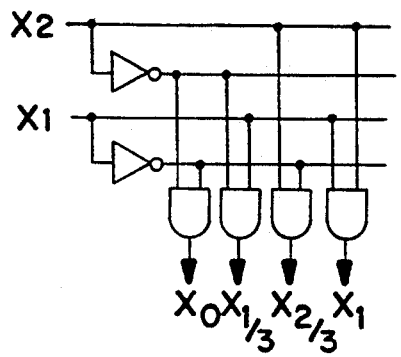
FIG. 18 is a block diagram for illustrating an input to the multiplying circuit shown in FIG. 14.
Figure 18B:
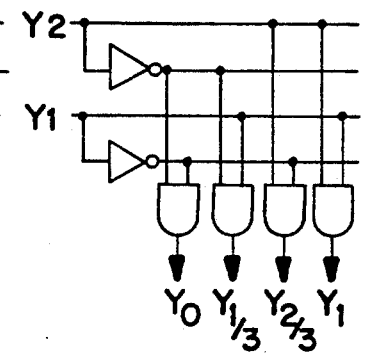
Figure 18C:
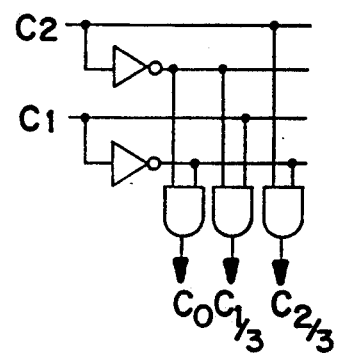
Figure 19A:
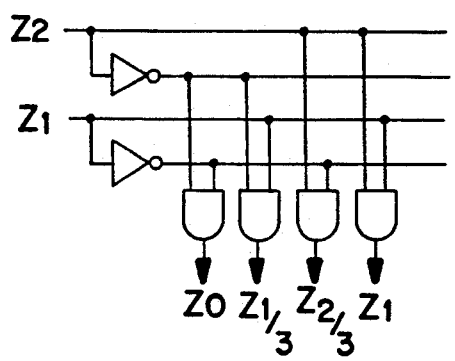
FIG. 19 is a block diagram for illustrating an input to the adding circuit shown in FIG. 16.
Figure 19B:
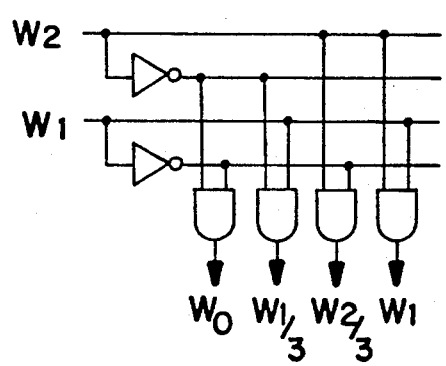

In the case of selecting the binary logic, the input to the multiplying circuit shown in FIG. 14 is as shown in FIG. 18. The input to the adding circuit is as shown in FIG. 19.

In the multiplying circuit shown in FIG. 14, a carry takes place at the time $t_i$ and is added to the multiplied output about the next bit, so that the carry output $<C>$, that is, $(C_2, C_1)$ is made to have the arrangement shown in FIG. 14. Further, since the carry is output at the time $t_{n+1}$ (i=1, 2, 3, ..., n), $C_2 t_{n+1}$ and $C_1 t_{n+1}$ are ORed with the output $(Z_2, Z_1)$.

Figure 16:
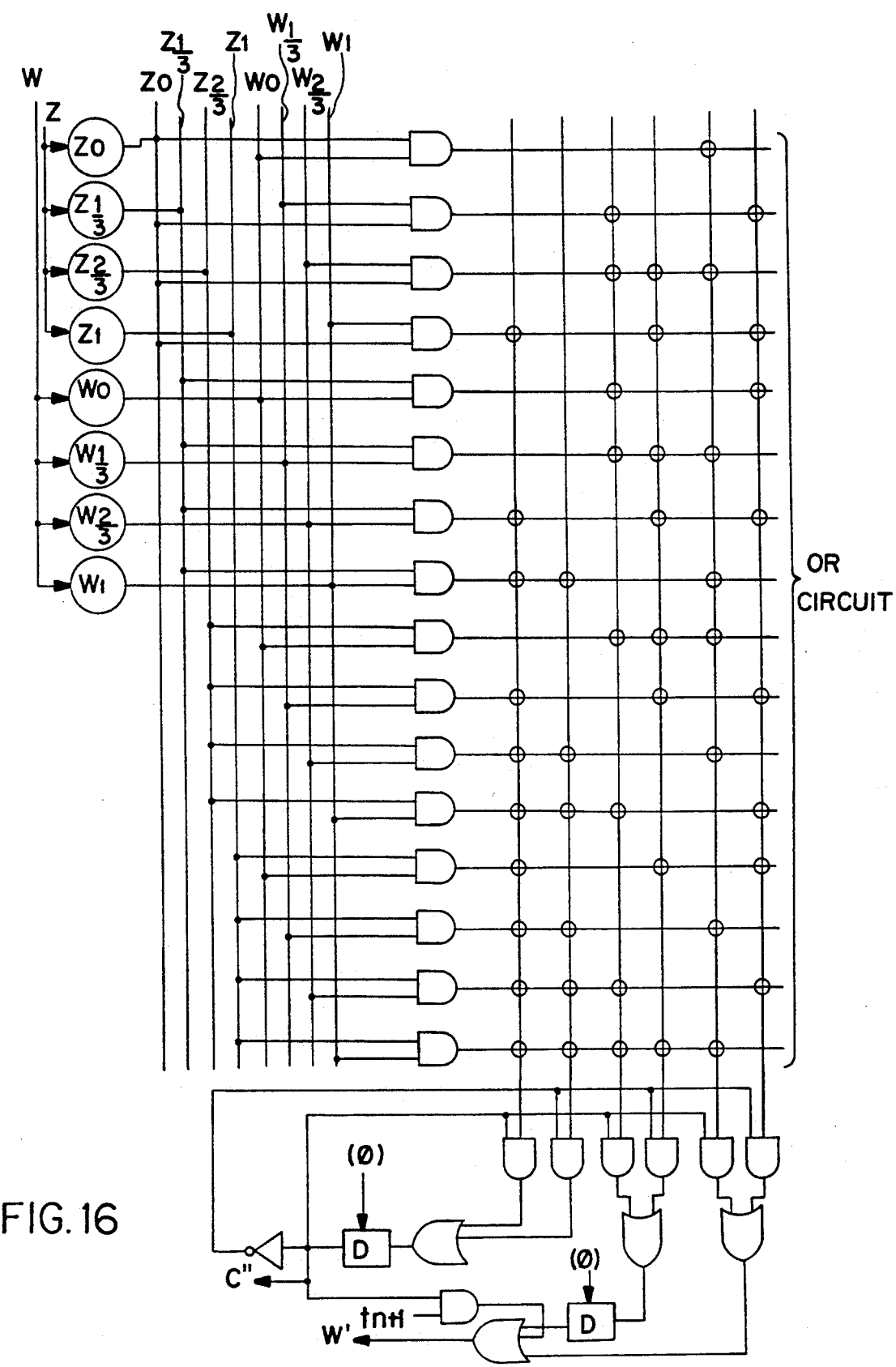
FIG. 16 is a block diagram showing an adding circuit applied to the multiplier shown in FIG. 2.

In the adding circuit shown in FIG. 16, the carry takes place at the time ti and is added to the added output about the next bit. Hence, the carry output C" appears as shown in FIG. 16. Considering that the carry is output at the time $t_{n+1}$, $C''t_{n+1}$ is ORed with W'.

Figure 20:
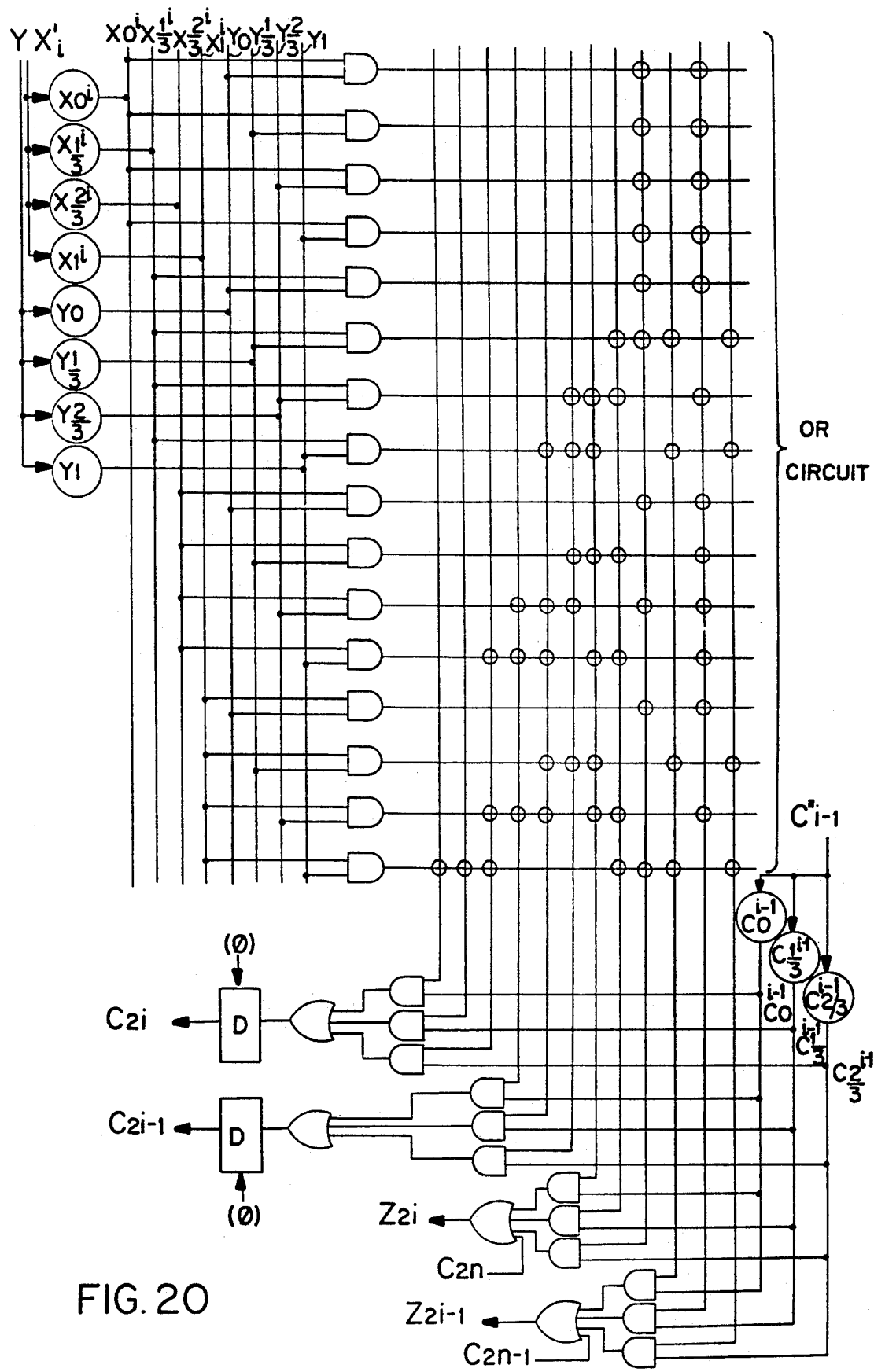
FIG. 20 is a block diagram showing a multiplying circuit applied to the multiplier shown in FIG. 3.
Figure 21C:
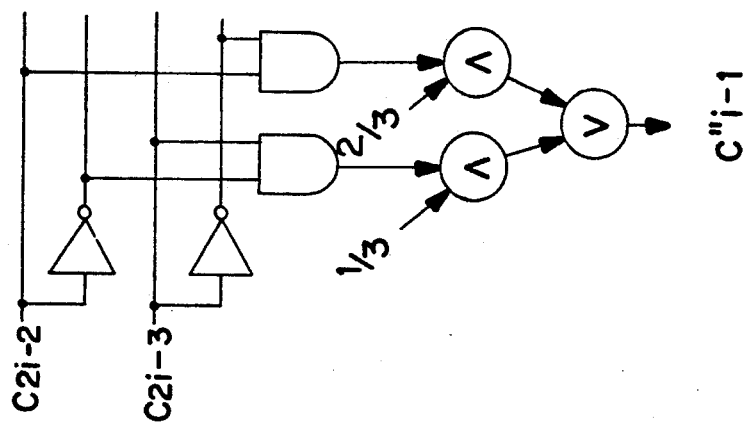
FIG. 21 is a block diagram for illustrating an input to the multiplying circuit shown in FIG. 20.
Figure 21B:
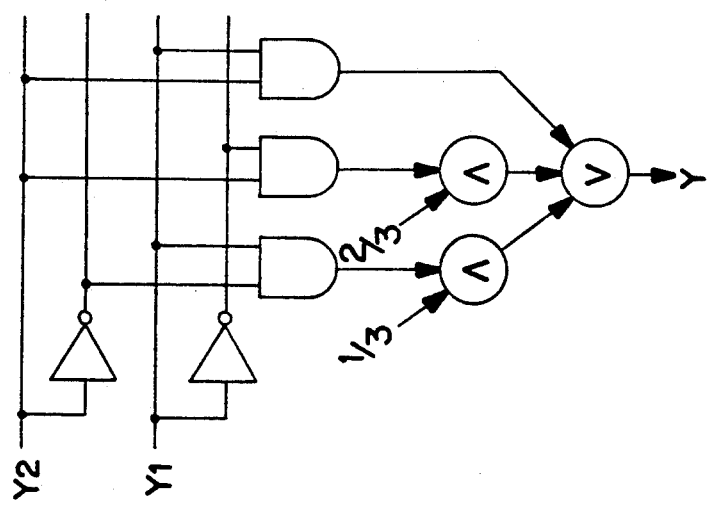
Figure 21A:
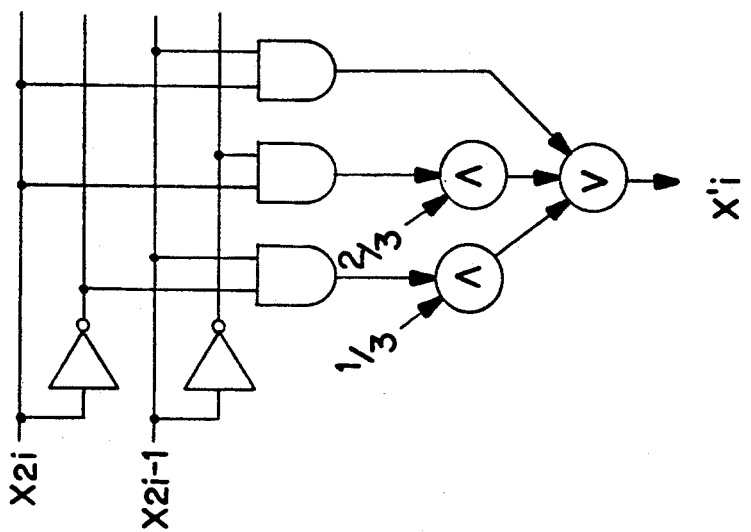
Figure 23B:
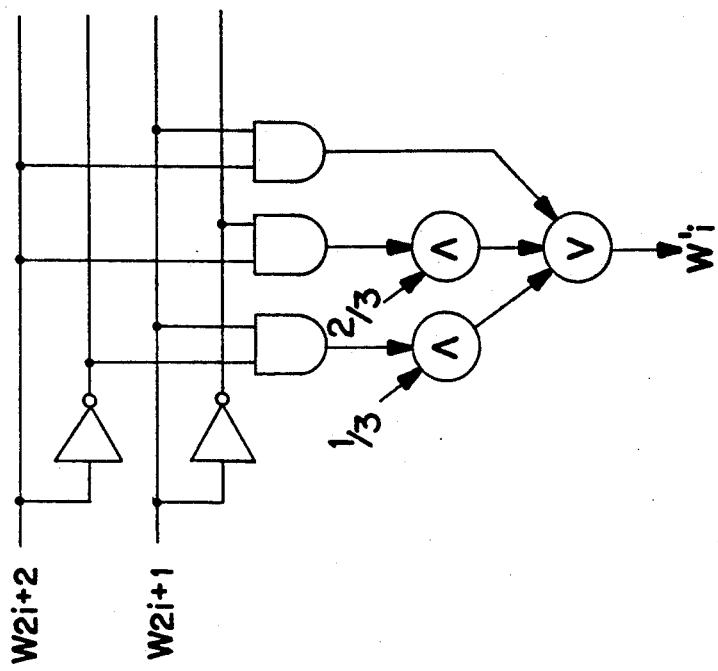
FIG. 23 is a block diagram for illustrating an input to the adding circuit shown in FIG. 22.
Figure 23A:
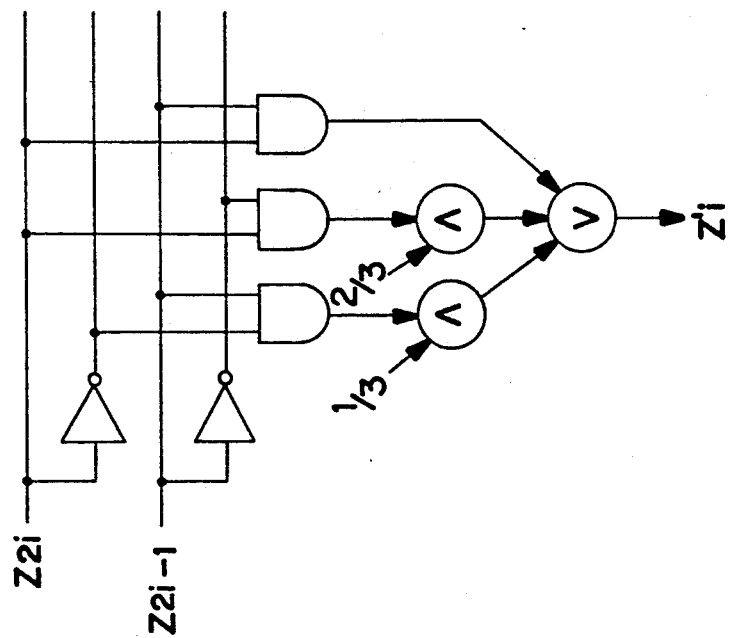

In the 2-bit-unit full-bit parallel type multiplier according to the third embodiment of the invention, if the quadruple logic is used, an input to the multiplying circuit shown in FIG. 20 passes through the arrangement shown in FIG. 21. An input to the adding circuit passes through the arrangement shown in FIG. 23.

Figure 24C:
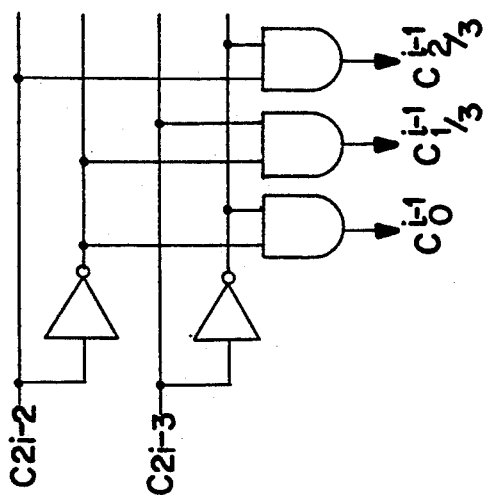
FIG. 24 is a block diagram for illustrating an input to the multiplying circuit shown in FIG. 20.
Figure 24B:
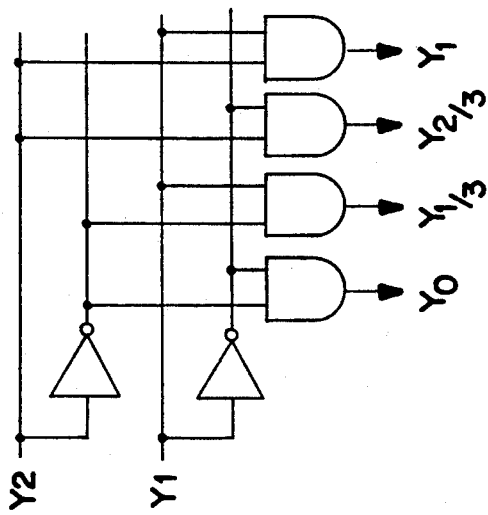
Figure 24A:
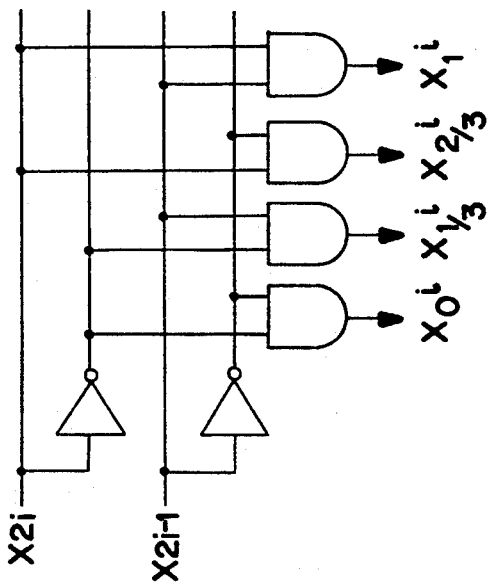
Figure 25:
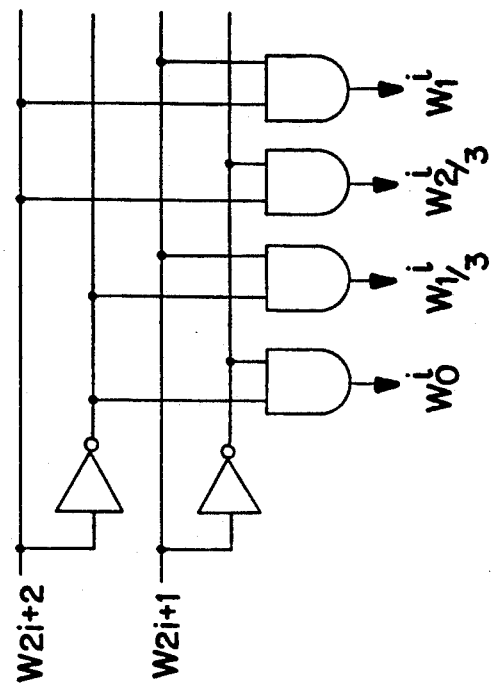
FIG. 25 is a block diagram for illustrating an input to the adding circuit shown in FIG. 22.
Figure 25A:
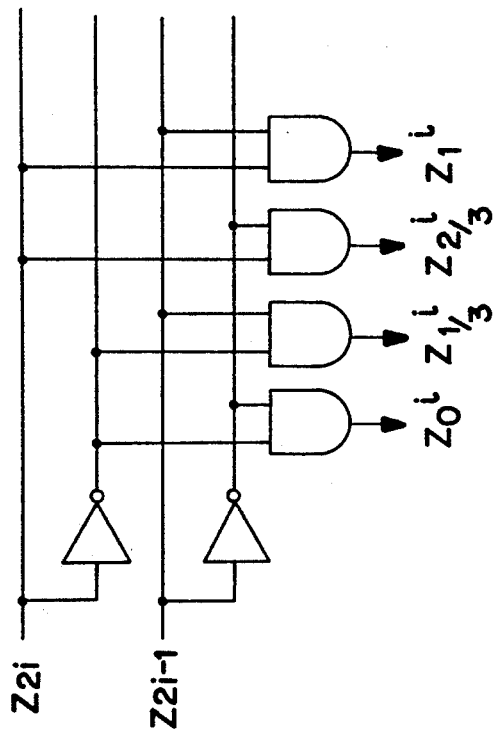

If the binary logic is used, an input to the multiplying circuit shown in FIG. 20 passes through the arrangement shown in FIG. 24. An input to the adding circuit shown in FIG. 22 passes through the arrangement shown in FIG. 25.

Figure 22:
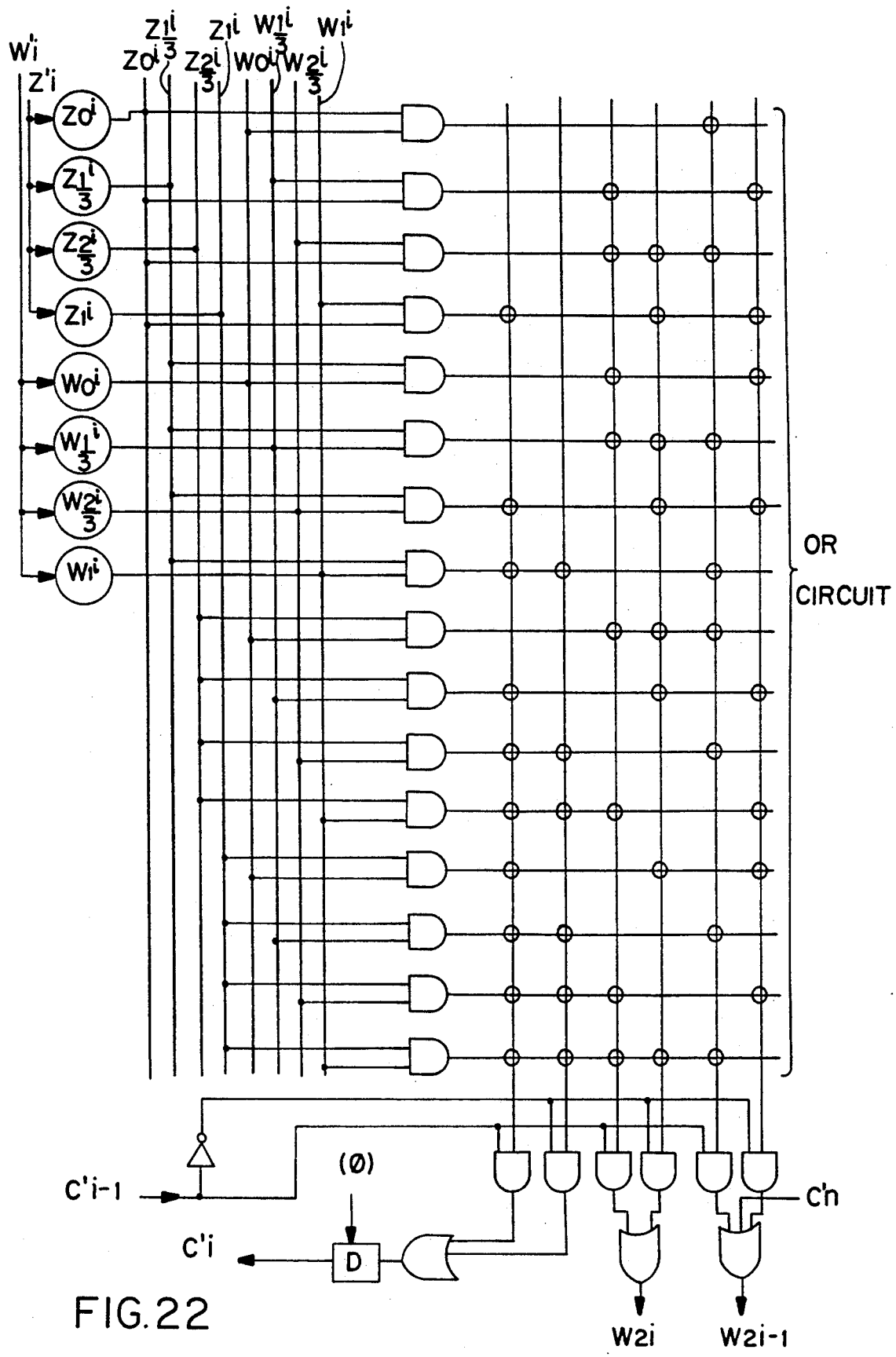
FIG. 22 is a block diagram showing an adding circuit applied to the multiplier shown in FIG. 3.

In the adding circuit shown in FIG. 22, considering that a carry may take place at the most significant bit, $C'_n$ is ORed with $W_{2i-1}$.

Since the adding circuit shown in FIG. 22 performs the parallel operation, $C'_{i-1}$ denotes a carry output from the previous stage and $C'_i$ denotes a carry input to the next stage. In the multiplying circuit shown in FIG. 20, $C_{2i-2}$ and $C_{2i-3}$ shown in FIGS. 21 and 24 are carry outputs from the previous stage. $C_{2i}$ and $C_{2i-1}$ are carry inputs to the next stage. The carry outputs $C_{2n}$, $C_{2n-1}$ at the final stages 2n and 2n−1 are ORed with the output $<Z>$, that is, $(Z_{2i}, Z_{2i-1})$.

Figure 26:
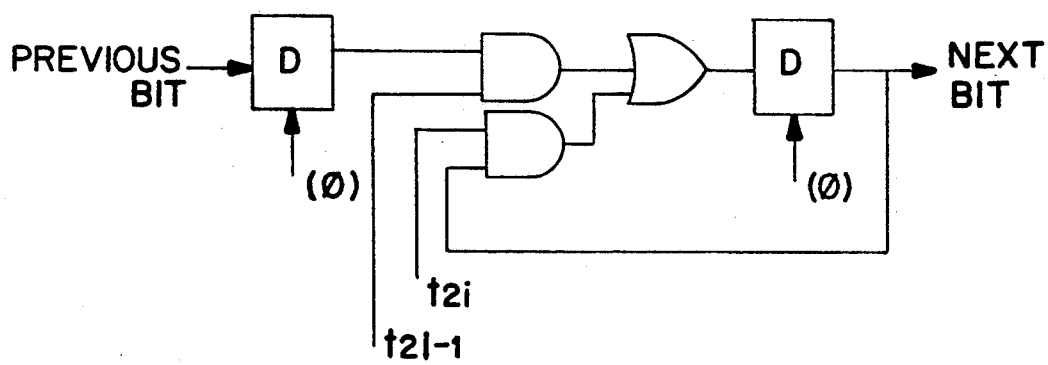
FIG. 26 is a block diagram for illustrating a bit-shifting arrangement of each register shown in FIG. 3.

In the YO register and the YE register, the bit-shifting arrangement is as shown in FIG. 26.

The multipliers according to the first to the third embodiments of the invention, each employs a floating-point operation or a fixed-point operation.

As an example, the floating-point operation will be described below.

Assume that a mantissa X of an operator is stored starting from the most significant digit in the X register, a mantissa Y of an operand is stored starting from the most significant digit in the Y register, and the exponents of the operator and the operand are denoted by x and y, respectively.

In the assumption, the following operation is performed for the multiplication.

$$X \cdot Y = W \cdot 4^{x+y} \qquad (2)$$

Assuming that a sign bit of X is $X_s$, a sign bit of Y is $Y_s$, indicating code bits of x, y as $x_s$, $y_s$, respectively, then a code $W_s$ of the mantissa can be represented by the following expression.

$$W_s = X_s \oplus Y_s \qquad (3)$$

The exponents are listed in the following table 2, wherein $x \geq 0$ and $y \geq 0$:

TABLE 2

| $x_s$ | $y_s$ | P      |       |   |       |   |       |   |
|-------|-------|--------|-------|---|-------|---|-------|---|
|       |       |        |       |   |       | Ps|       |   |
| 0     | 0     | x + y  | —     | 0 | —     | 0 | —     | 0 |
| 0     | 1     | x − y  | x > y | 0 | x = y | 0 | x < y | 1 |
| 1     | 0     | −(x − y)| x > y| 1 | x = y | 0 | x < y | 0 |
| 1     | 1     | −(x + y)| —    | 1 | —     | 1 | —     | 1 | wherein p denotes an exponent of a mantissa W of the multiplied result and $p_s$ denotes a sign bit of p.

Figure 27:
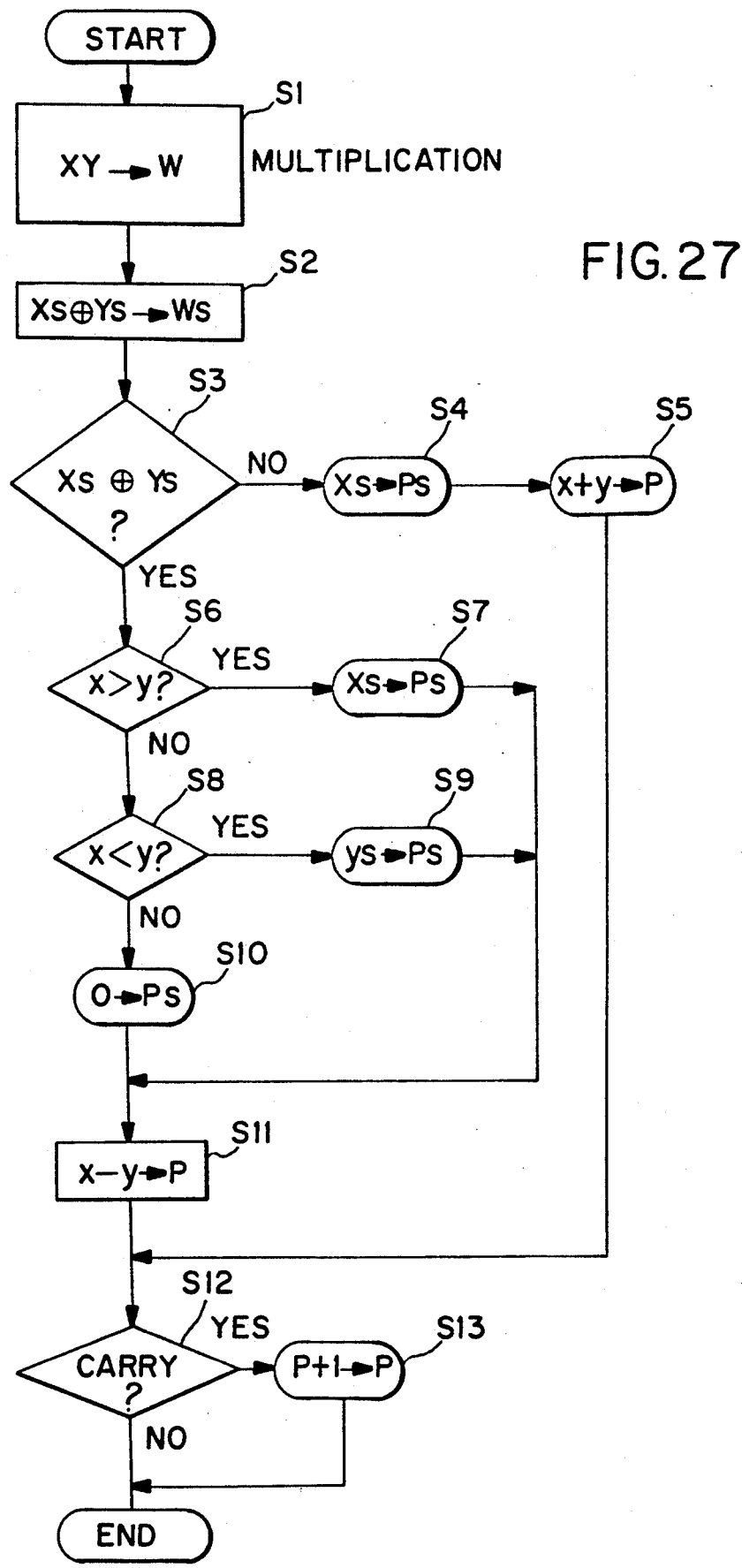
FIG. 27 is a flowchart for illustrating process of a mantissa and an exponent in the multiplier according to the invention.

The foregoing operation may be represented by the flowchart shown in FIG. 27. In the flowchart, $p+1 \rightarrow p$ is executed, because the carry may take place from the most significant digit by multiplying the mantissa X by the mantissa Y. This flowchart (steps S1 to S13) and the circuit arrangement for implementing the operation illustrated in the flowchart are allowed to be implemented by the known means. Hence, the description about them is left out.

The foregoing process may be implemented by the fixed-point operation.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for processing a multiplication of multi-valued data, comprising:
    register means for shifting data stored therein and outputting said shifted data therefrom;
    multiplying means connected to said register means for multiplying said shifted data output from said register means to produce multiplied results;
    adding means connected to said multiplying means for adding said multiplied results according to a predetermined arithmetic rule based on logic to be used; and
    means for shifting said added results output from said adding means and for outputting said shifted results.

2. An apparatus according to claim 1, wherein said shifting means includes a first shifting means connected to said adding means for shifting said added results output from said adding means and for outputting said shifted results.

3. An apparatus according to claim 2, wherein said apparatus further comprises means for storing said shifted results output from said shifting means.

4. An apparatus according claim 3, wherein said storing means includes a first register connected to said adding means for storing said shifted results output from said adding means according to said first shifting means.

5. An apparatus according to claim 4, wherein said shifting means further includes a second shifting means connected to said first register for shifting said stored results and for outputting said shifted results therefrom.

6. An apparatus according to claim 5, wherein said storing means further includes a second register connected to said second shifting means for storing said shifted results output from said first register.

7. An apparatus according to claim 5, wherein said shifting means further includes a third shifting means connected to said second shifting means for further shifting said shifted results output from said second shifting means.

8. An apparatus according to claim 1, wherein said stored data is a binary signal.

9. An apparatus according to claim 1, wherein said stored data is a triple signal.

10. An apparatus according to claim 1, wherein said stored data is a quadruple signal.

11. A multiplier which is capable of processing a multiplication of multi-valued data, comprising:
 register means for shifting data stored and outputting a plurality of data;
 multiplying means connected to said register means for multiplying said outputs from said register means to produce multiplied results;
 adding means connected to said multiplying means for adding said multiplied results according to a predetermined arithmetic rule based on logic to be used;
 first shifting means connected to said adding means for shifting and sending out said outputs from said adding means;
 first register connected to said adding means for storing said shifted outputs from said adding means according to said first shifting means;
 second shifting means connected to said first register for shifting and sending out said outputs from said first register;
 third shifting means connected to said second shifting means for further shifting said outputs from said second shifting means; and
 second register connected to said second shifting means for storing said shifted output from said first register.

12. An apparatus according to claim 11, wherein said stored data is a binary signal.

13. An apparatus according to claim 11, wherein said stored data is a triple signal.

14. An apparatus according to claim 11, wherein said stored data is a quadruple signal.

15. A multiplier which is suitable to process multi-valued data comprising:
 register means for shifting data stored therein and for outputting said shifted data;
 a plurality of first data output means for outputting first data based on a predetermined arithmetic rule based on logic to be used;
 a plurality of multiplication means connected to said register means and said first data output means for multiplying an output from said register means and an output from said first data output means;
 a plurality of second data output means for outputting second data based on a predetermined arithmetic ruled based on logic to be used; and
 a plurality of addition means connected to said multiplication means for adding an output from said multiplication means, an output from said second data output means and a specific input altogether, and for outputting said added result to another second data output means located adjacent to said second data output means.

16. A multiplier according to claim 15, wherein an addition means located at an end of said plurality of addition means is capable of adding an output of said multiplication means and said specific input, and outputting said added result to said second data output means located adjacent to said adding means.

17. An apparatus according to claim 15, wherein said stored data is a binary signal.

18. An apparatus according to claim 15, wherein said stored data is a triple signal.

19. An apparatus according to claim 15, wherein said stored data is a quadruple signal.

* * * * *